(12) United States Patent
Nge et al.

(10) Patent No.: US 10,739,844 B2
(45) Date of Patent: Aug. 11, 2020

(54) SYSTEM, APPARATUS AND METHOD FOR OPTIMIZED THROTTLING OF A PROCESSOR

(71) Applicant: Intel Corporation, Santa Clara, CA (US)

(72) Inventors: Chee Lim Nge, Beaverton, OR (US); James G. Hermerding, II, Vancouver, WA (US); Pronay Dutta, Portland, OR (US); Joshua Resch, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 93 days.

(21) Appl. No.: 15/969,198

(22) Filed: May 2, 2018

(65) Prior Publication Data

US 2019/0041969 A1    Feb. 7, 2019

(51) Int. Cl.
| | |
|---|---|
| G06F 1/32 | (2019.01) |
| G06F 1/3296 | (2019.01) |
| G06F 9/48 | (2006.01) |
| G06F 1/3206 | (2019.01) |
| G06F 1/324 | (2019.01) |
| G06F 1/3234 | (2019.01) |
| G06F 1/26 | (2006.01) |
| G06F 9/50 | (2006.01) |
| G06F 1/30 | (2006.01) |

(Continued)

(52) U.S. Cl.
CPC ............ *G06F 1/3296* (2013.01); *G06F 1/263* (2013.01); *G06F 1/30* (2013.01); *G06F 1/324* (2013.01); *G06F 1/3206* (2013.01); *G06F 1/329* (2013.01); *G06F 1/3212* (2013.01); *G06F 1/3243* (2013.01); *G06F 9/4893* (2013.01); *G06F 9/5094* (2013.01)

(58) Field of Classification Search
CPC ......... G06F 1/324; G06F 1/3296; G06F 1/206
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |

(Continued)

FOREIGN PATENT DOCUMENTS

EP    1 282 030 A1    5/2003

OTHER PUBLICATIONS

International Searching Authority, "Notification of Transmittal of the International Search Report and the Written Opinion of the International Searching Authority," dated Aug. 6, 2019, in International application No. PCT/US2019/025299.

(Continued)

*Primary Examiner* — Albert Wang
(74) *Attorney, Agent, or Firm* — Trop, Pruner & Hu, P.C.

(57) ABSTRACT

In one embodiment, a processor includes: a plurality of processing elements to perform operations; a power management agent (PMA) coupled to the plurality of processing elements to control power consumption of the plurality of processing elements; and a throttling circuit coupled to the PMA. The throttling circuit is to determine a throttling power level for the plurality of processing elements based at least in part on translation information communicated from the PMA. Other embodiments are described and claimed.

19 Claims, 20 Drawing Sheets

(51) Int. Cl.
*G06F 1/329* (2019.01)
*G06F 1/3212* (2019.01)

(56) References Cited

U.S. PATENT DOCUMENTS

| | | | |
|---|---|---|---|
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0346774 A1 | 12/2013 | Bhandaru et al. | |
| 2014/0068290 A1 | 3/2014 | Bhandaru et al. | |
| 2014/0195829 A1 | 7/2014 | Bhandaru et al. | |
| 2014/0208141 A1 | 7/2014 | Bhandaru et al. | |
| 2014/0317425 A1 | 10/2014 | Lien et al. | |
| 2016/0070327 A1* | 3/2016 | Nemani | G06F 1/324 |
| | | | 713/300 |
| 2016/0070328 A1 | 3/2016 | Berke et al. | |
| 2016/0154591 A1 | 6/2016 | Breakstone et al. | |
| 2016/0291676 A1* | 10/2016 | Akimoto | G06F 1/3234 |
| 2017/0285703 A1 | 10/2017 | Diamand et al. | |
| 2017/0364132 A1 | 12/2017 | Gendler et al. | |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

Intel Corporation, "Intel 64 and IA-32 Architectures Software Developer's Manual," vol. 3B: System Programming Guide, Part 2, Apr. 2016, Chapter 14 Power and Thermal Management (14.1-14. 9.5), 39 pages.

Intel Technology Journal, "Power and Thermal Management in the Intel Core Duo Processor," May 15, 2006, pp. 109-122.

U.S. Appl. No. 15/936,585, filed Mar. 27, 2018, entitled System, Apparatus and Method for Providing Hardware Feedback Information in a Processor, by Vedvyas Shanbhogue, et al.

* cited by examiner

SYSTEM, APPARATUS AND METHOD FOR OPTIMIZED THROTTLING OF A PROCESSOR

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
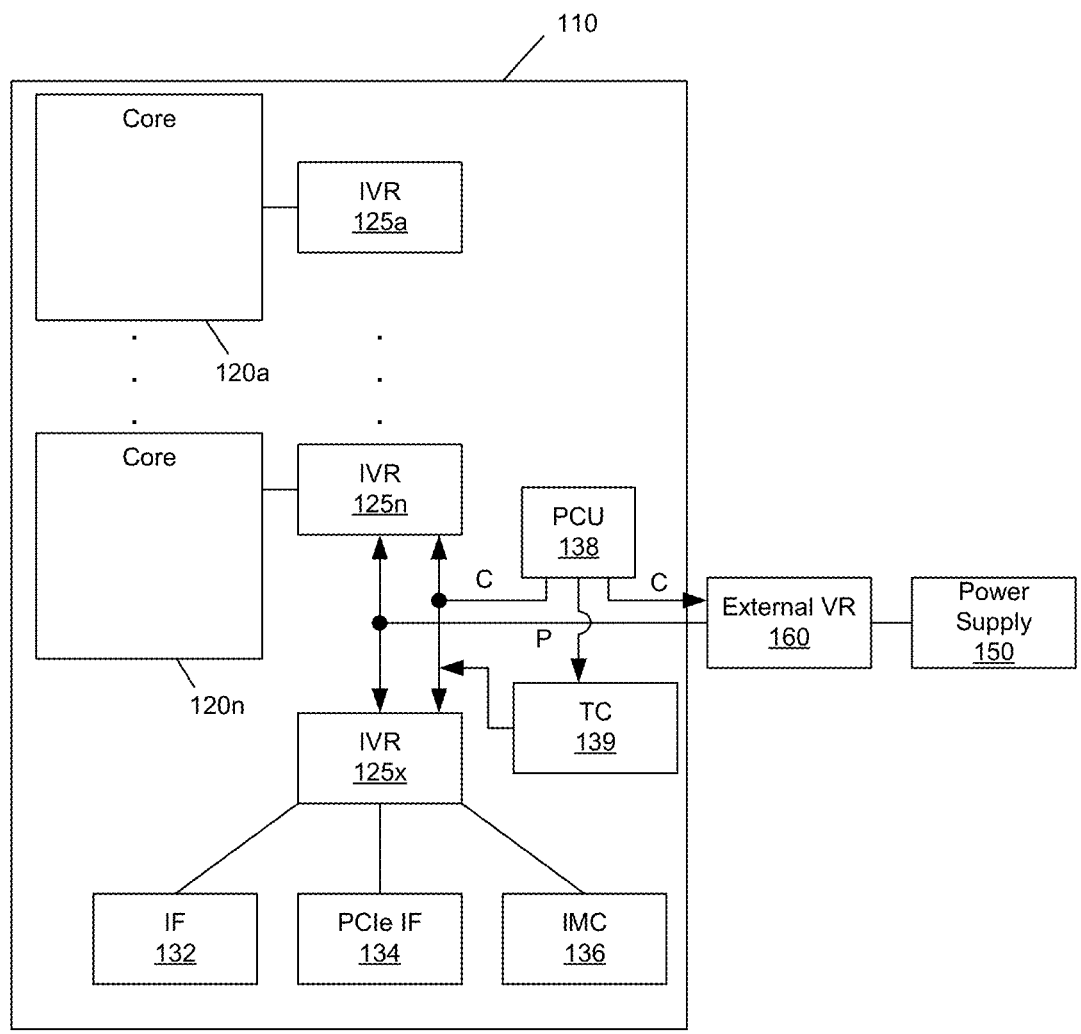
FIG. 1 is a block diagram of a portion of a system in accordance with an embodiment of the present invention.

In various embodiments, a processor such as a multicore processor or other system on chip (SoC) may be configured, in response to indication of a platform event, to perform throttling of one or more processing elements of the processor in an optimized manner. That is, rather than immediately causing all operation within the processor to be throttled to a minimum operating point, processor performance may be optimized in a throttle condition, without compromising protection mechanisms to protect against electrical failure in light of the platform event. More specifically as described herein a first agent, namely a platform target agent, may proactively determine an optimal throttling power target for the overall processor. In turn, another agent, referred to herein as a power management agent, may proactively determine optimal throttling targets for each processing element based at least in part on user activity, priority information or so forth. Then in turn, additional agents, referred to herein as throttling agents may, based at least in part on these optimized processing element throttling targets and the overall optimized throttling power target, dynamically control an operating point for the processing elements. Such dynamically controlled operating points may be optimized such that a processor need not immediately degenerate to a minimum operating point.

With embodiments as described herein, appropriate throttling behavior may be maintained for a processor while at the same time preserving performance capabilities. That is, throttling levels that are optimized as described herein may be set at levels at which typical workloads may still operate at suitable performance levels. However, understand that in worst case conditions, such as a virus workload level, full throttling mechanisms may be implemented to cause all processing elements to operate at minimum operating points.

Note that in embodiments, such optimized throttling behavior may occur based on input power capability. That is, when a given power source such as a battery source is sufficiently charged, throttling behavior need not be restricted to a minimal operating point, as the battery source can provide sufficient power to operate at throttling levels greater than such minimum operating points.

In contrast, conventional platforms, in response to a platform event, typically cause a processor to be forced to operate at a lowest operating point (e.g., a lowest frequency and/or voltage mode), which can undesirably affect performance. Instead in embodiments, based at least in part on a priori knowledge of input power capabilities (e.g., charge capacity), processor throttling in response to a platform event may be at a level higher than a lowest operating point, thereby avoiding an unnecessary performance penalty.

When the platform detects that there is a potential functional failure, the platform generates a fast signal to quickly throttle processor power in order to avoid the functional failure. In this situation, a processor in accordance with an embodiment may be configured to optimize performance when it is throttled, without compromising the protection mechanism (to avoid the functional failure). To this end, processor mechanisms are provided to proactively set an optimal throttling power target for the processor, and proactively set an optimal operating point of each processing element based at least in part on user activity. After these proactive settings have been generated, when a throttle signal is received (namely in response to detection of a potential functional failure), the processing elements may be controlled with low latency to operate at no higher than a respective processing element throttling power target level.

Although the following embodiments are described with reference to specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores 120$_a$-120$_n$. In addition, each core may be associated with an integrated voltage regulator (IVR) 125$_a$-125$_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator 125$_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

In embodiments herein, PCU 138 may be configured to control domains within processor 110 to operate at one of multiple different operating points. More specifically, PCU 138 may determine operating points for the different domains. In addition, understand that a fast mechanism, e.g., external to PCU 138, may be involved in performing throttle operations in response to a platform event. Thus as illustrated further in FIG. 1, a throttling circuit 139 (which in some cases may be a distributed hardware circuit) may further be in communication with IVRs 125 (and/or cores 120 themselves). In this way, throttling circuit 139 may, based at least in part on translation information received from PCU 138, translate a processor throttling power level to corresponding throttling levels for individual domains (such as cores 120 or so forth), as described further herein.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Processors described herein may leverage power management techniques that may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Figure 2:
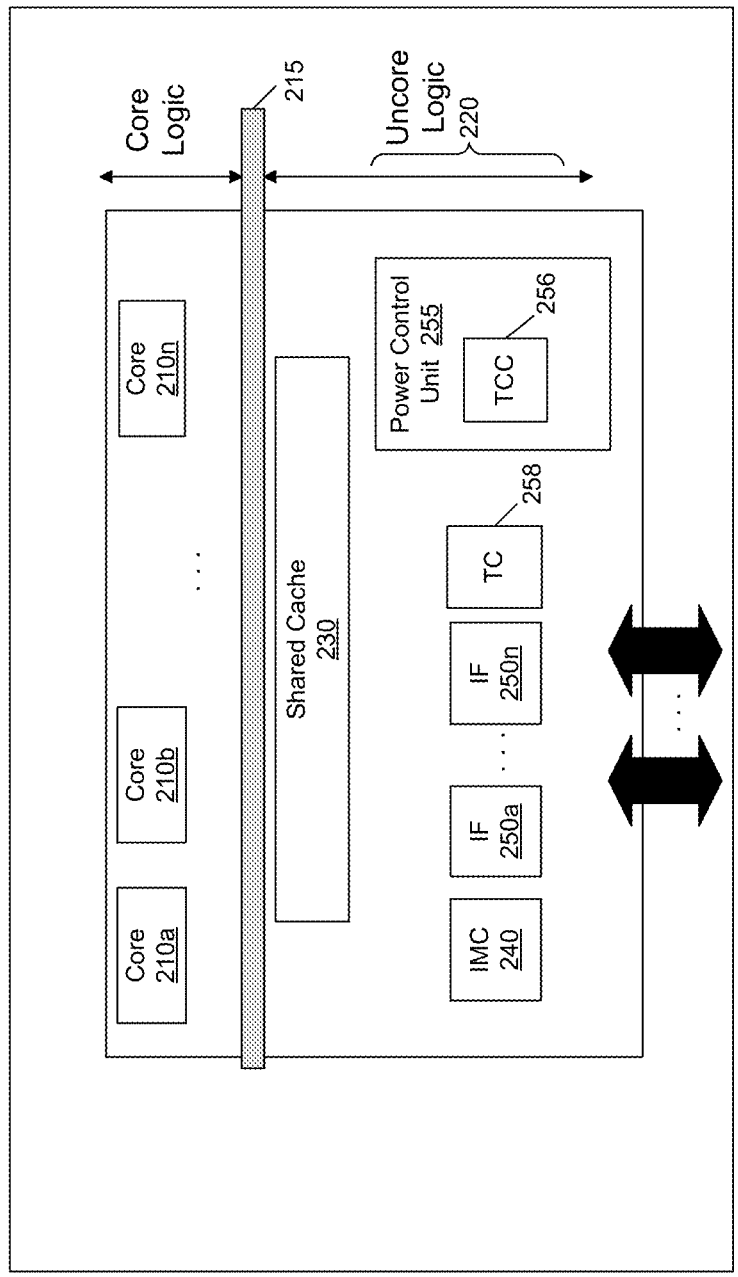
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250, a performance monitoring unit (PMU) 260 and a power control unit 255, which may include logic to perform power management techniques as described herein. In addition, power control unit 255 may include a throttle control circuit 256 which may, based at least in part on hint information, dynamically determine translation information to be used by a throttling circuit 258 to enable such circuitry to dynamically determine throttling power levels for individual cores 210 (and potentially other components of processor 200), to enable low latency operating point changes in response to a platform event.

In addition, by interfaces $250_a$-$250_n$, connection can be made to various off-chip components such as peripheral devices, mass storage and so forth. While shown with this particular implementation in the embodiment of FIG. 2, the scope of the present invention is not limited in this regard.

Figure 3:
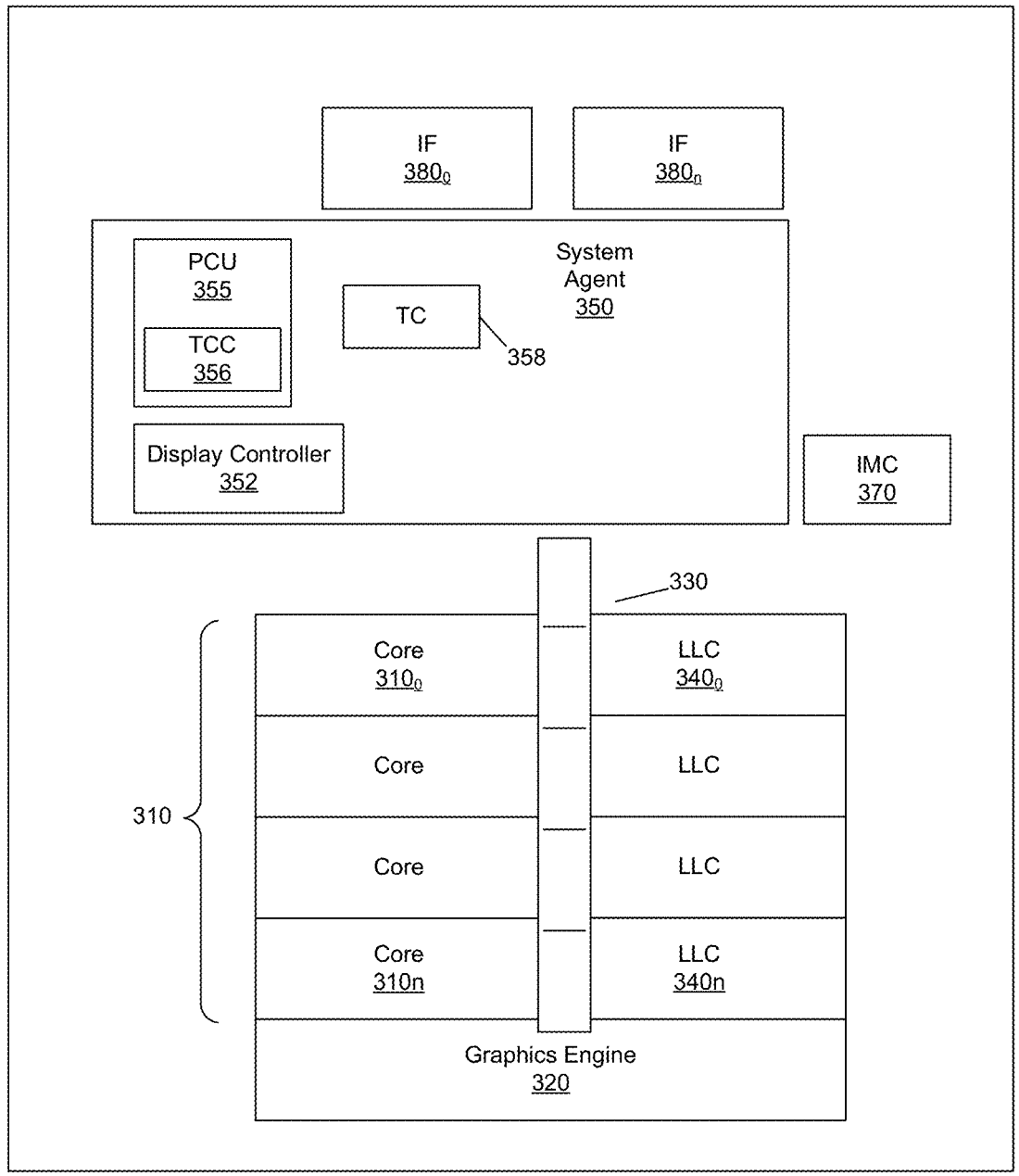
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355, which can include throttle control circuit 356 to determine translation information based at least in part on hint information regarding workloads being executed on cores 310, graphics engine 320 and so forth. In turn, PCU 355 provides such information to a throttling circuit 358 to enable throttling circuit 358 to determine throttling operating points for corresponding cores/graphics engines and enable low latency transitions to such updated operating points, as described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
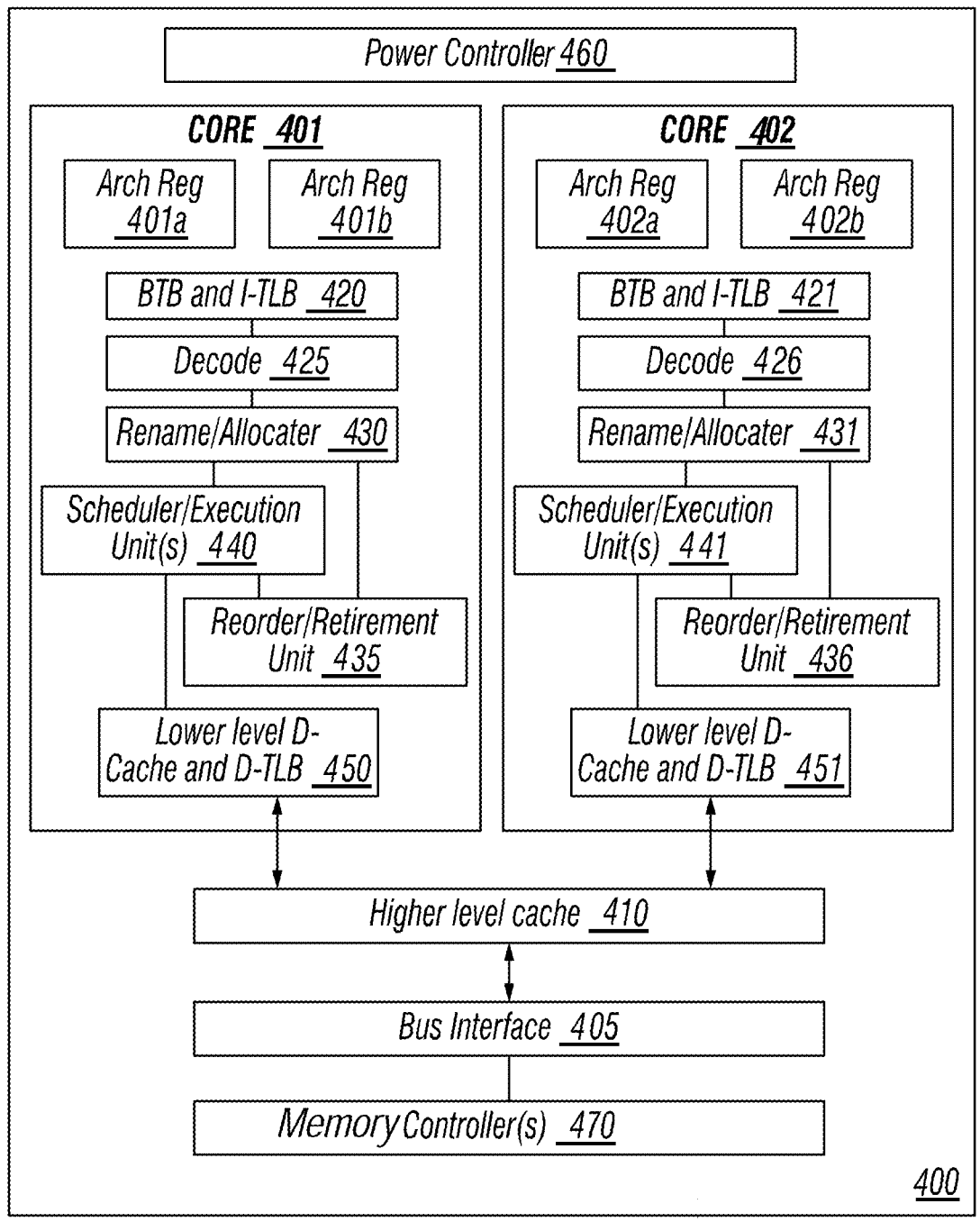
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
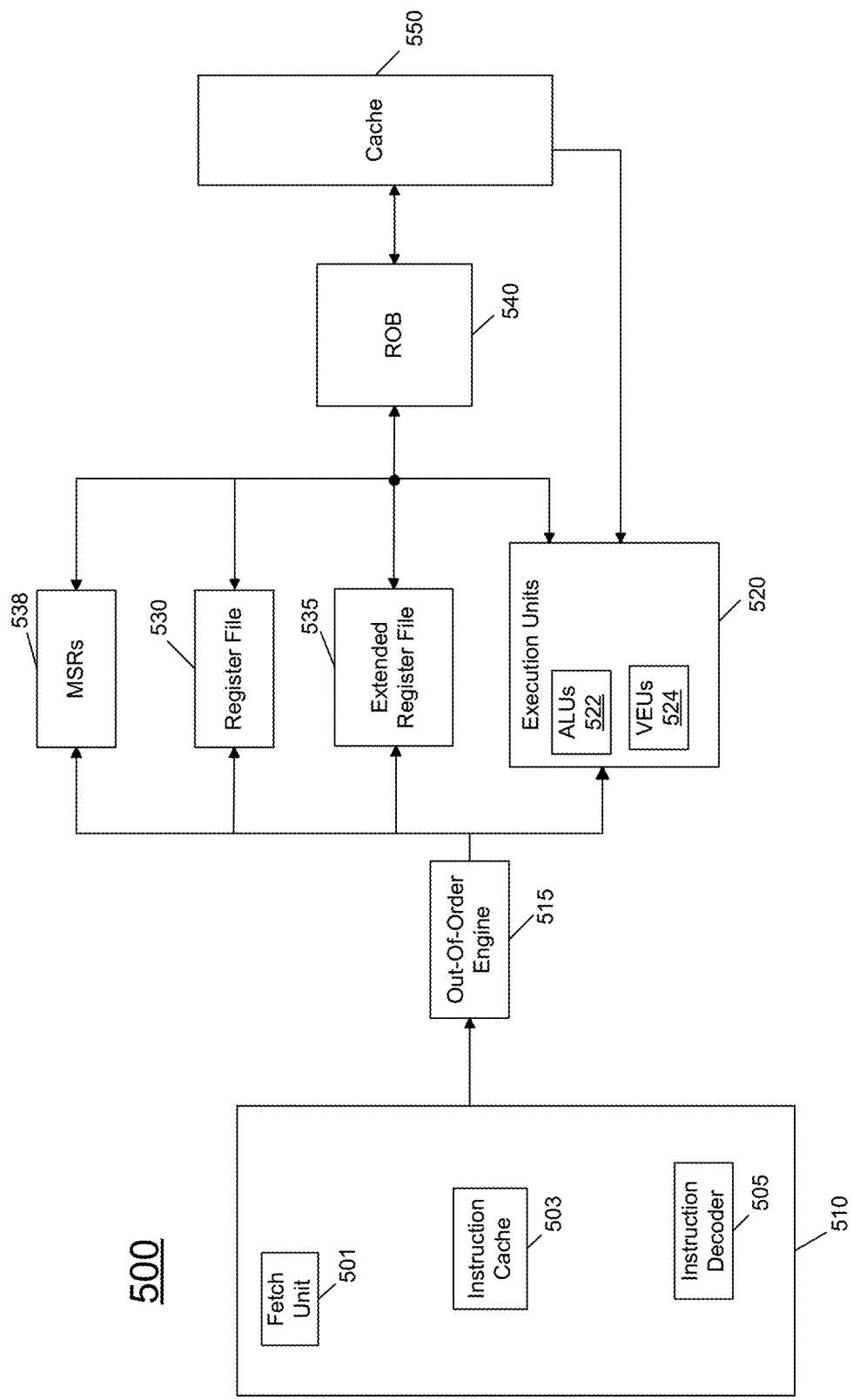
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. Note that performance and energy efficiency capabilities of core 500 may vary based on workload and/or processor constraints. As such, a power controller (not shown in FIG. 5) may dynamically determine an appropriate configuration for all or a portion of processor 500 based at least in part on thermal set point, determined as described herein. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
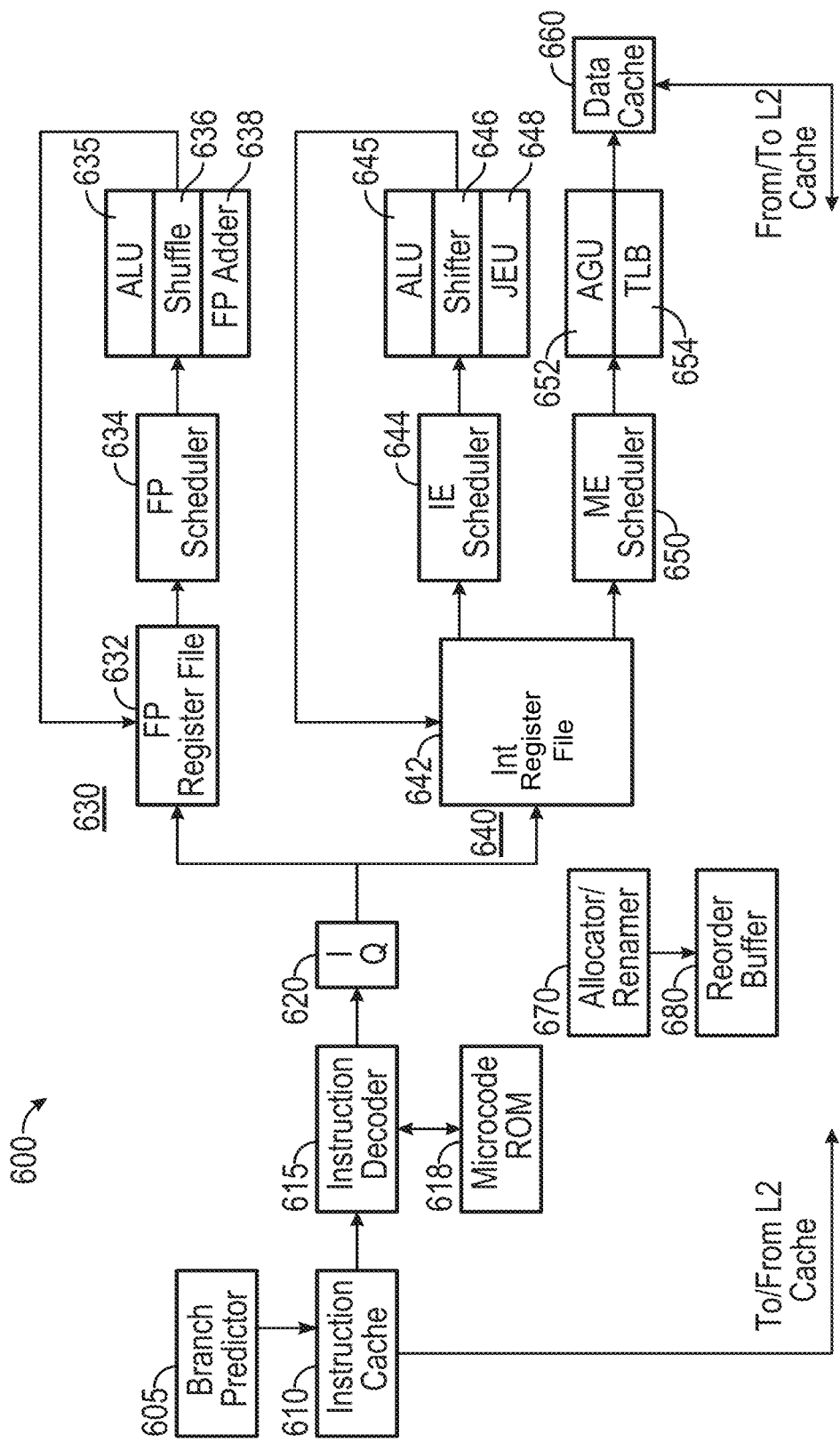
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Note that performance and energy efficiency capabilities of core 600 may vary based on workload and/or processor constraints. As such, a power controller (not shown in FIG. 6) may dynamically determine an appropriate configuration for all or a portion of processor 500 based at least in part on thermal set point, determined as described herein. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
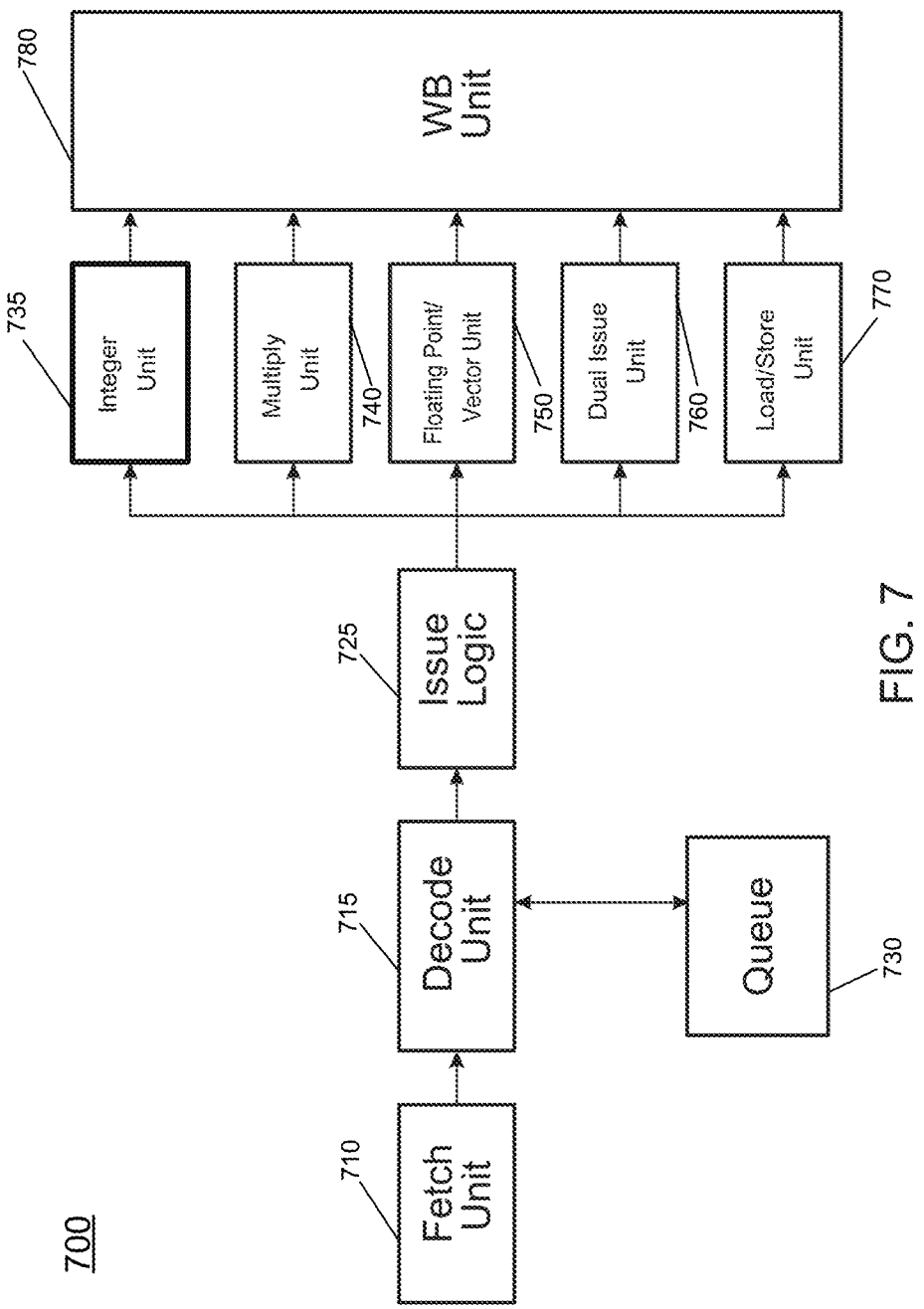
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instruction and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
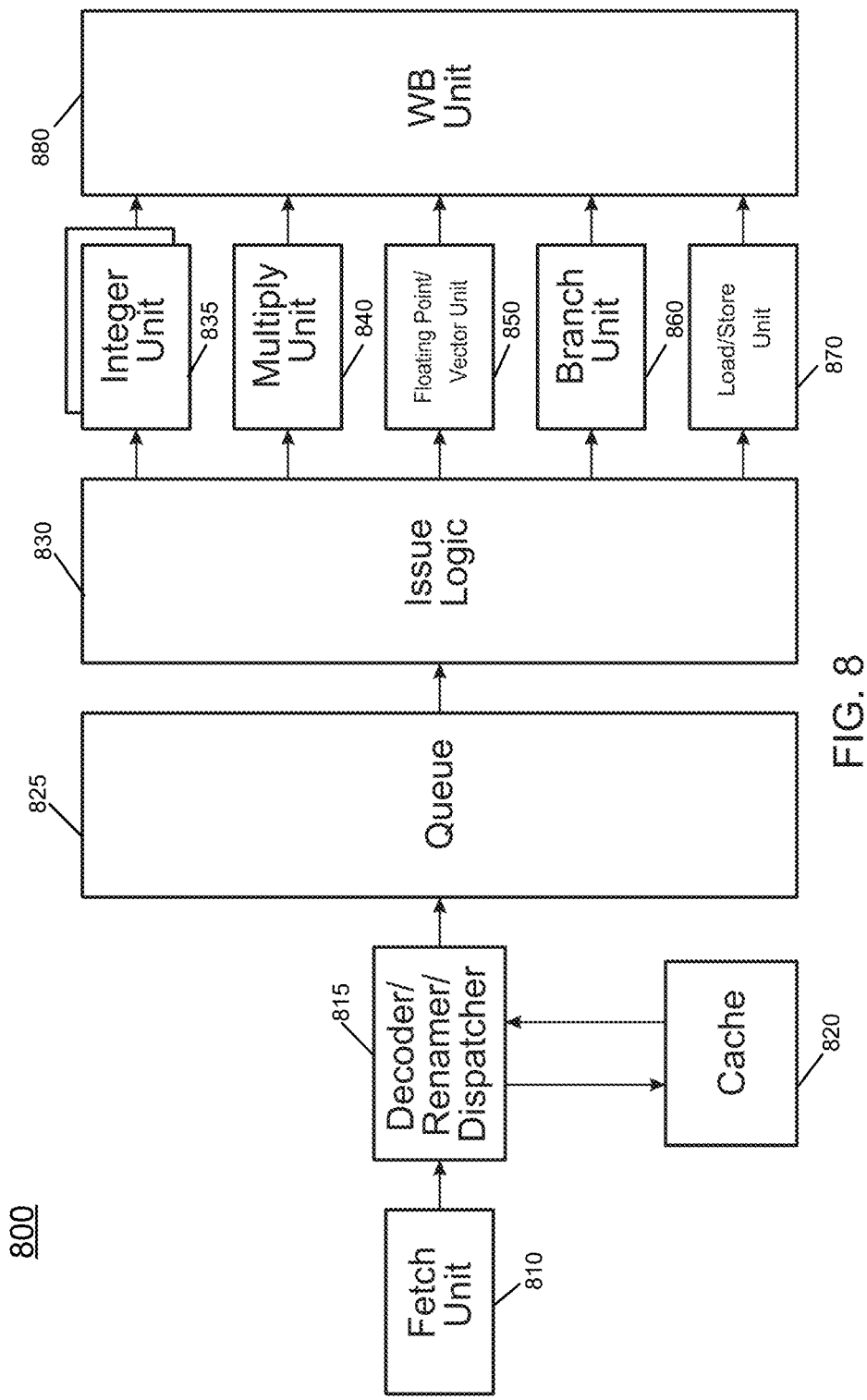
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
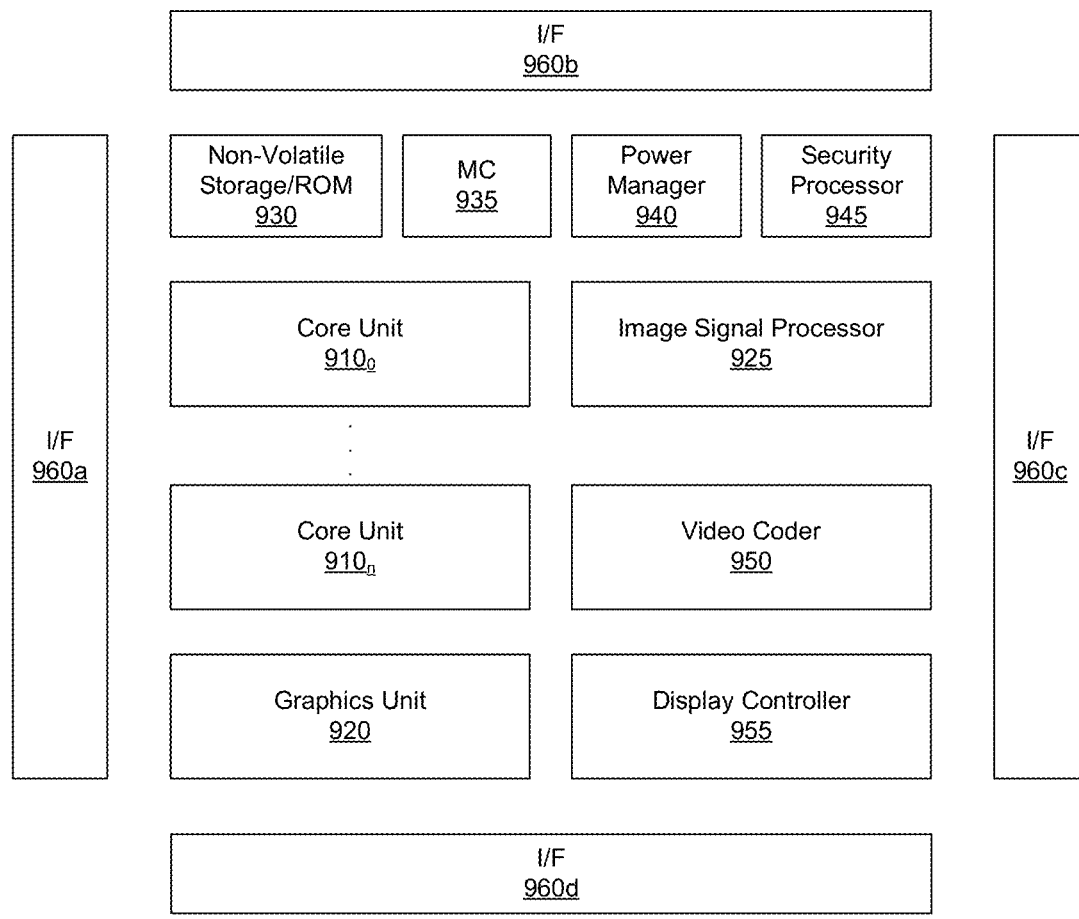
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, or a vehicle computing system.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software and other information. In embodiments, non-volatile storage 930 may store multiple configurations as described herein, which may be prioritized for use by firmware.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein, including dynamic determination of an appropriate configuration based on thermal point selection.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
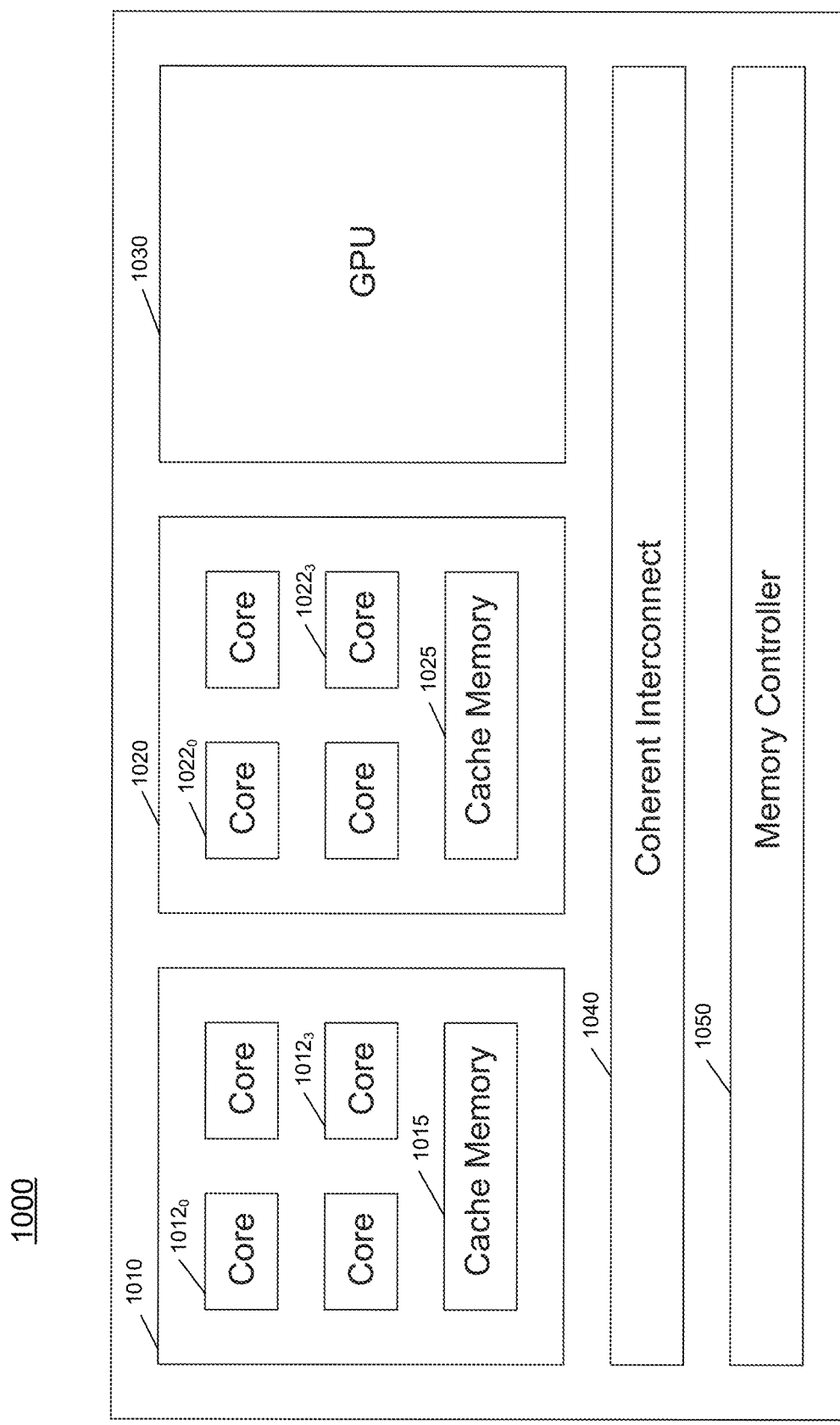
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device or vehicle computing system. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores as described herein. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
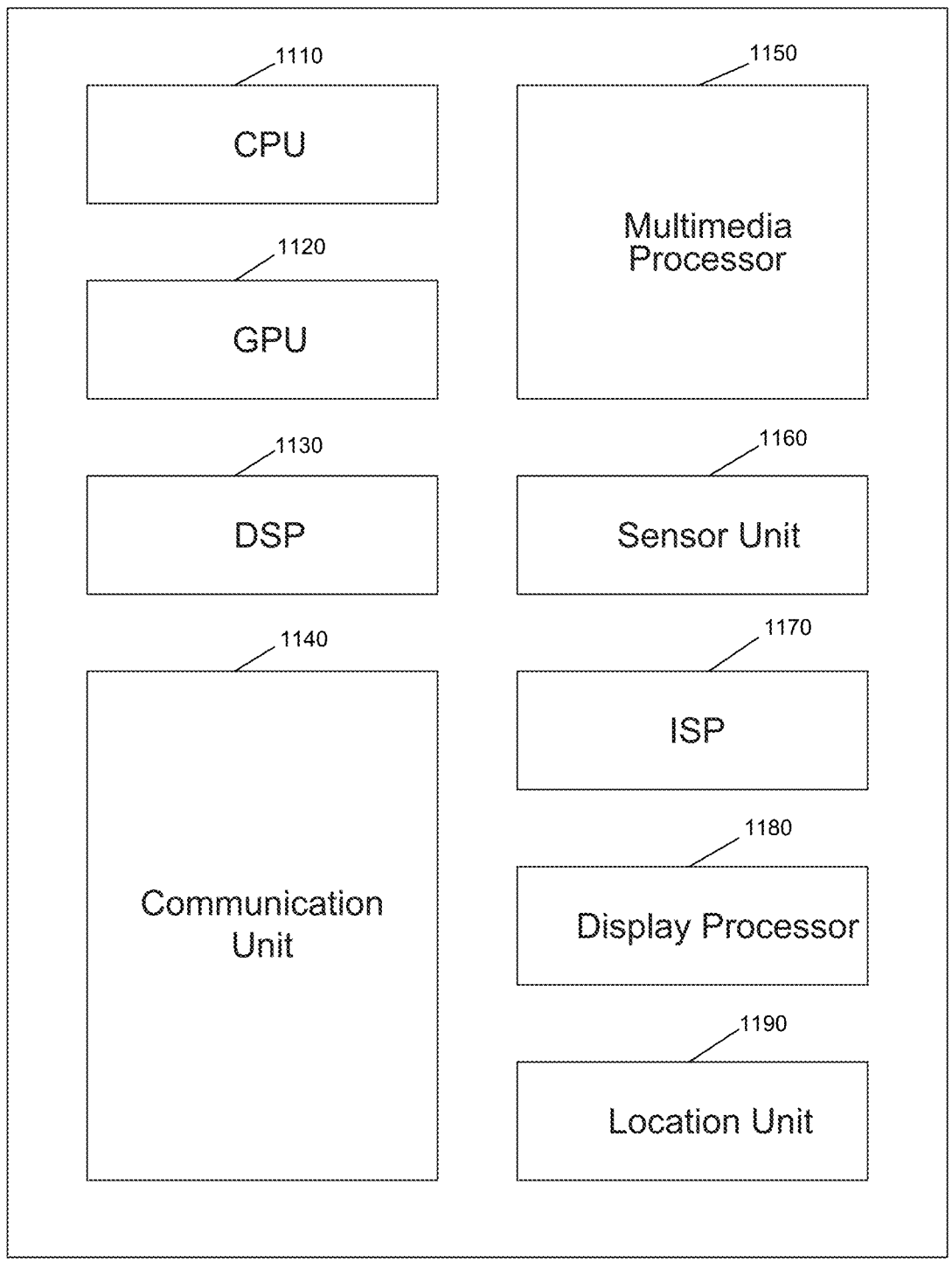
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs, vehicle computing systems, and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
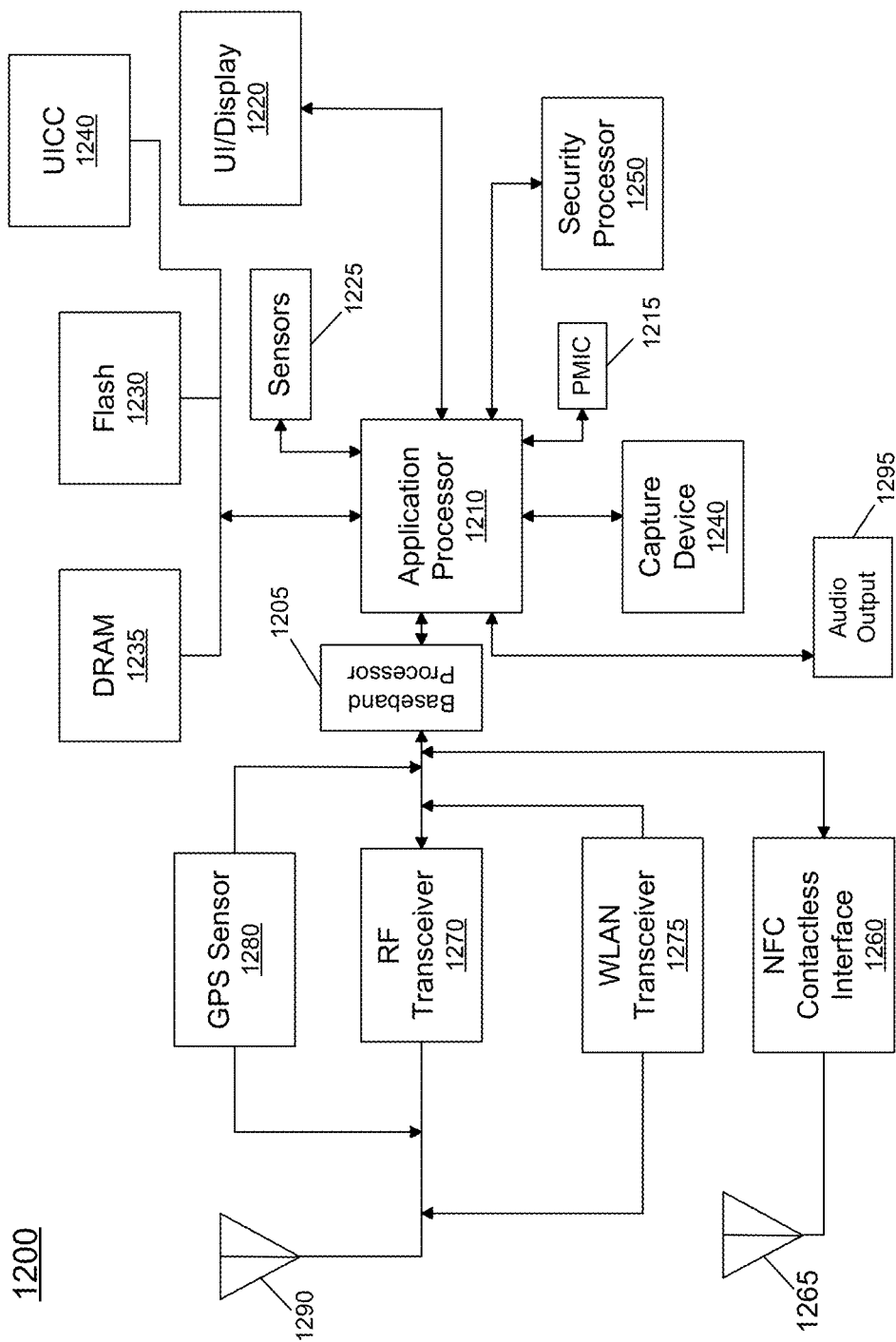
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may include a power controller and throttling circuit as described herein, and may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200. Still further as described herein, PMIC 1215 may send a throttling signal to application processor 1210 in response to a given platform event.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
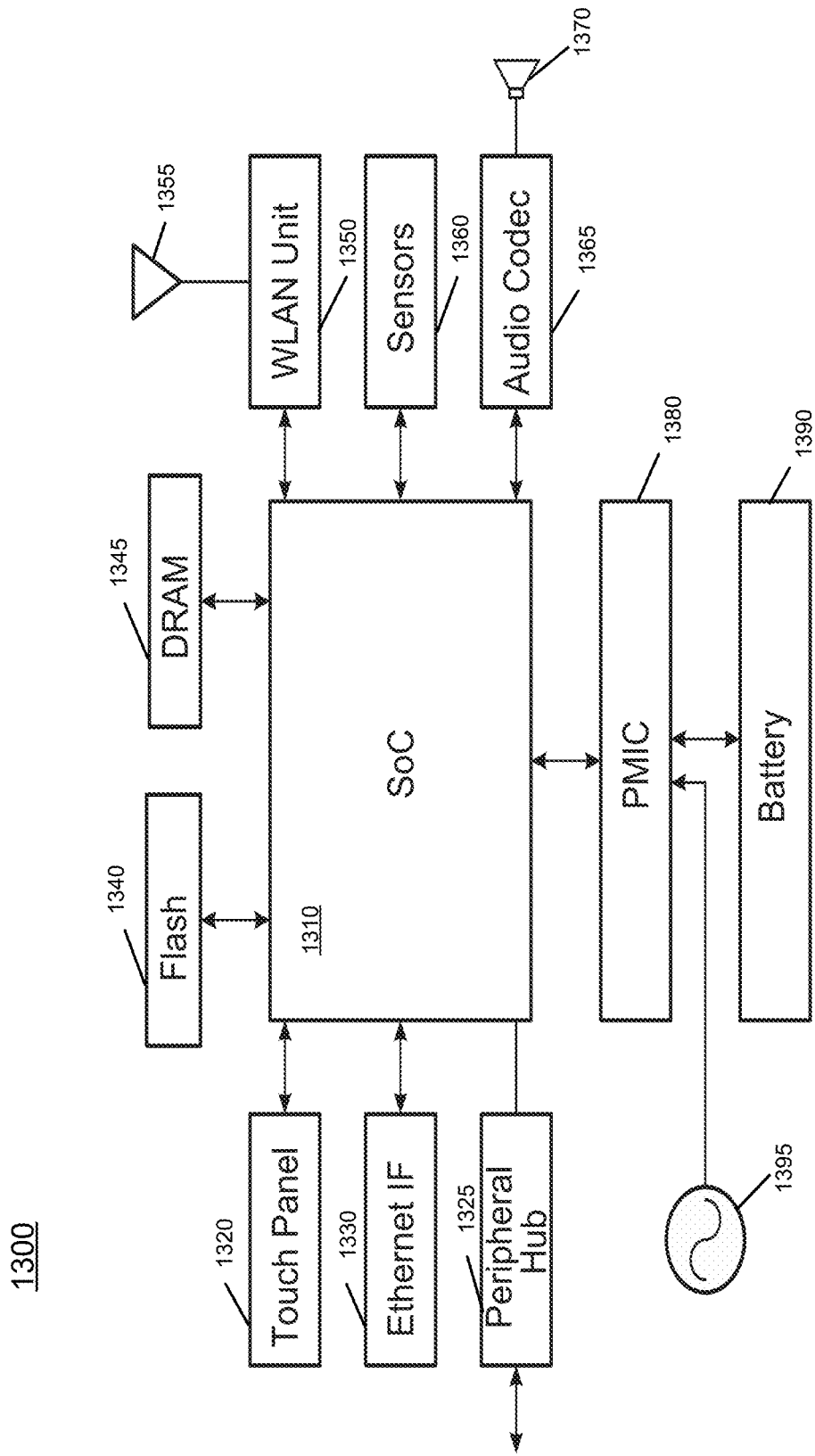
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device and which may include a power controller and throttling circuit as described herein.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310. Still further as described herein PMIC 1380 may send a throttling signal to SoC 1310 in response to a given platform event.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
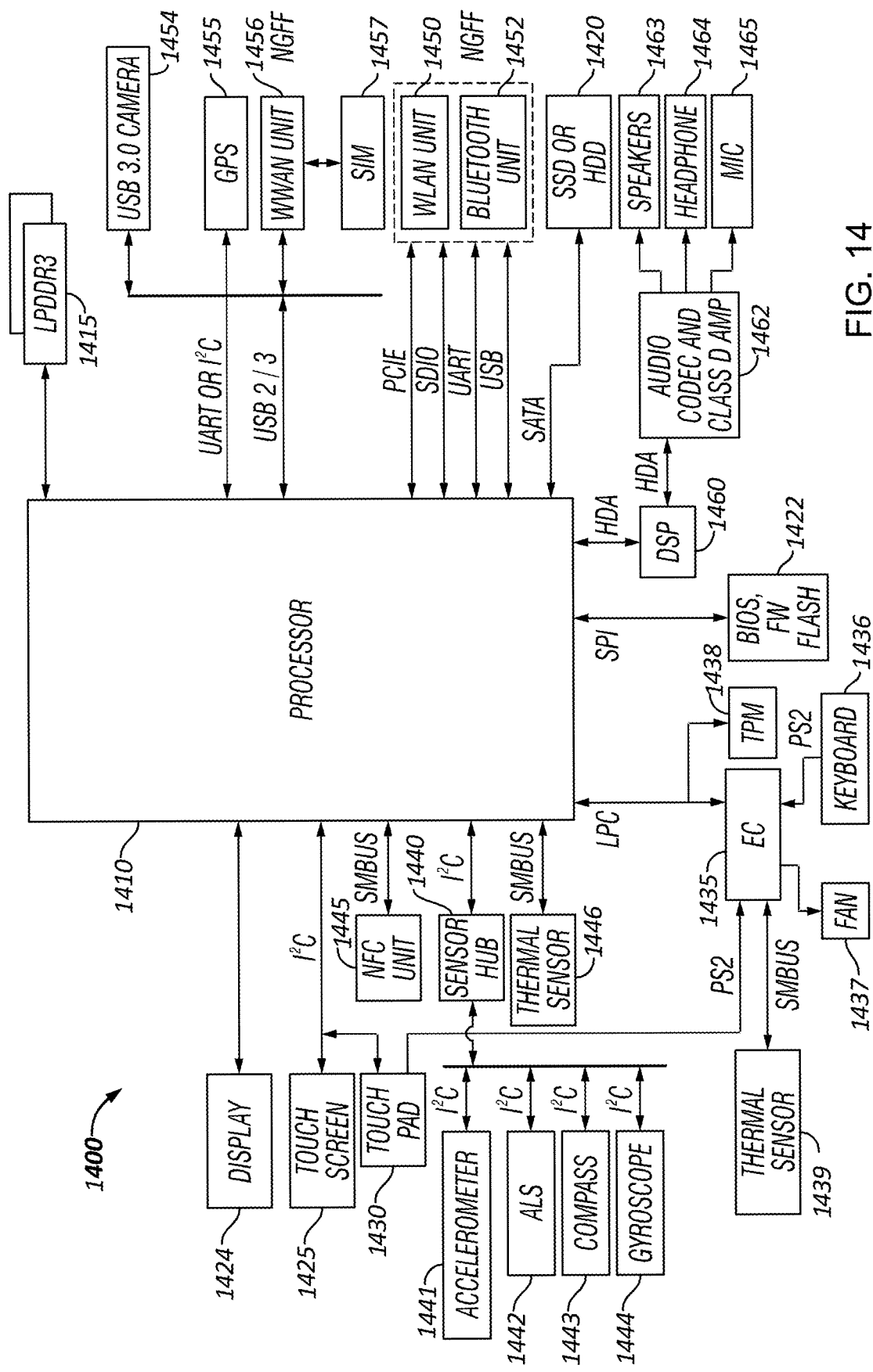
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC and which may include a power controller and throttling circuit as described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen

1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
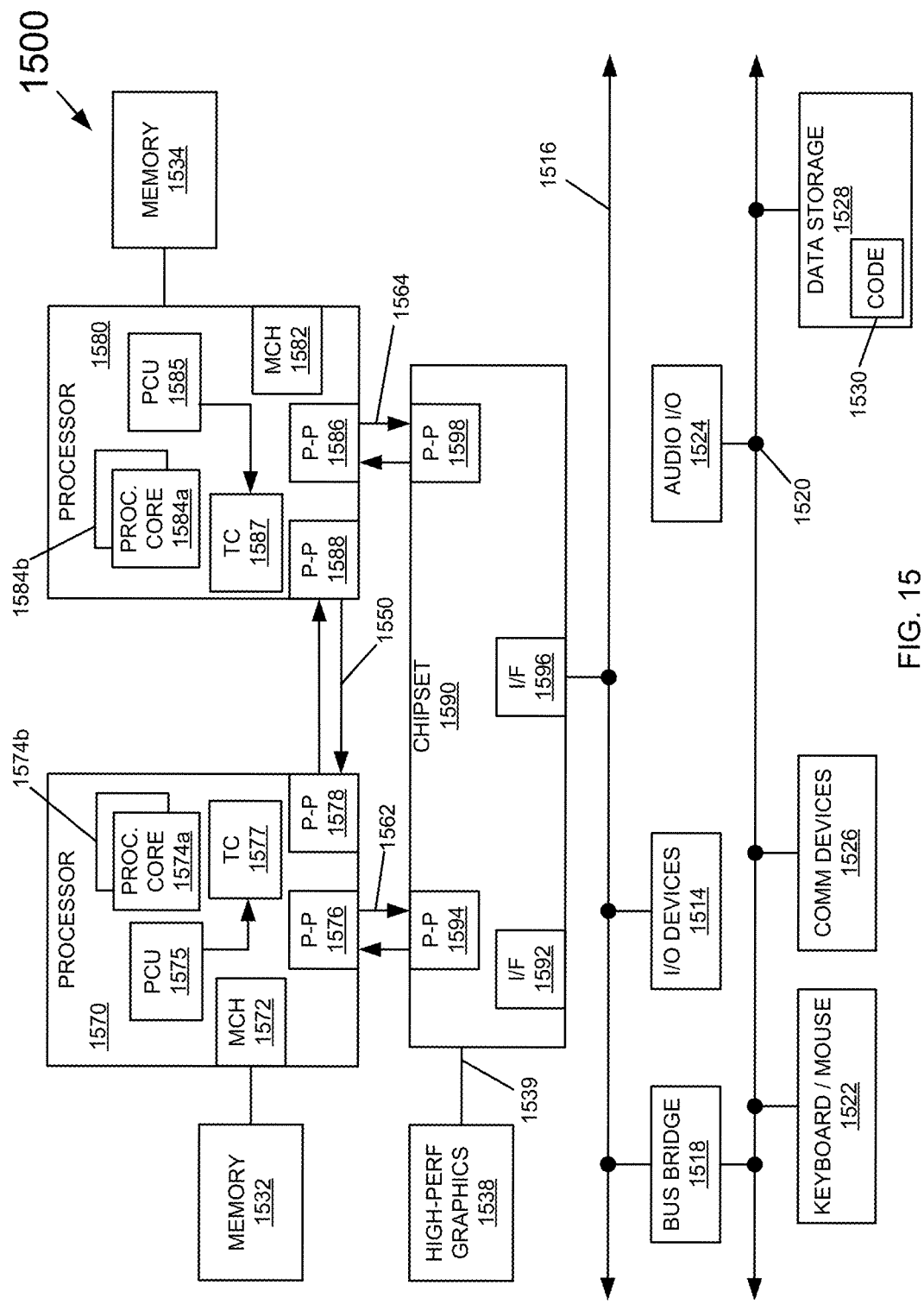
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU 1575, 1585 or other power management logic, and a throttling circuit 1577, 1587.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Figure 16:
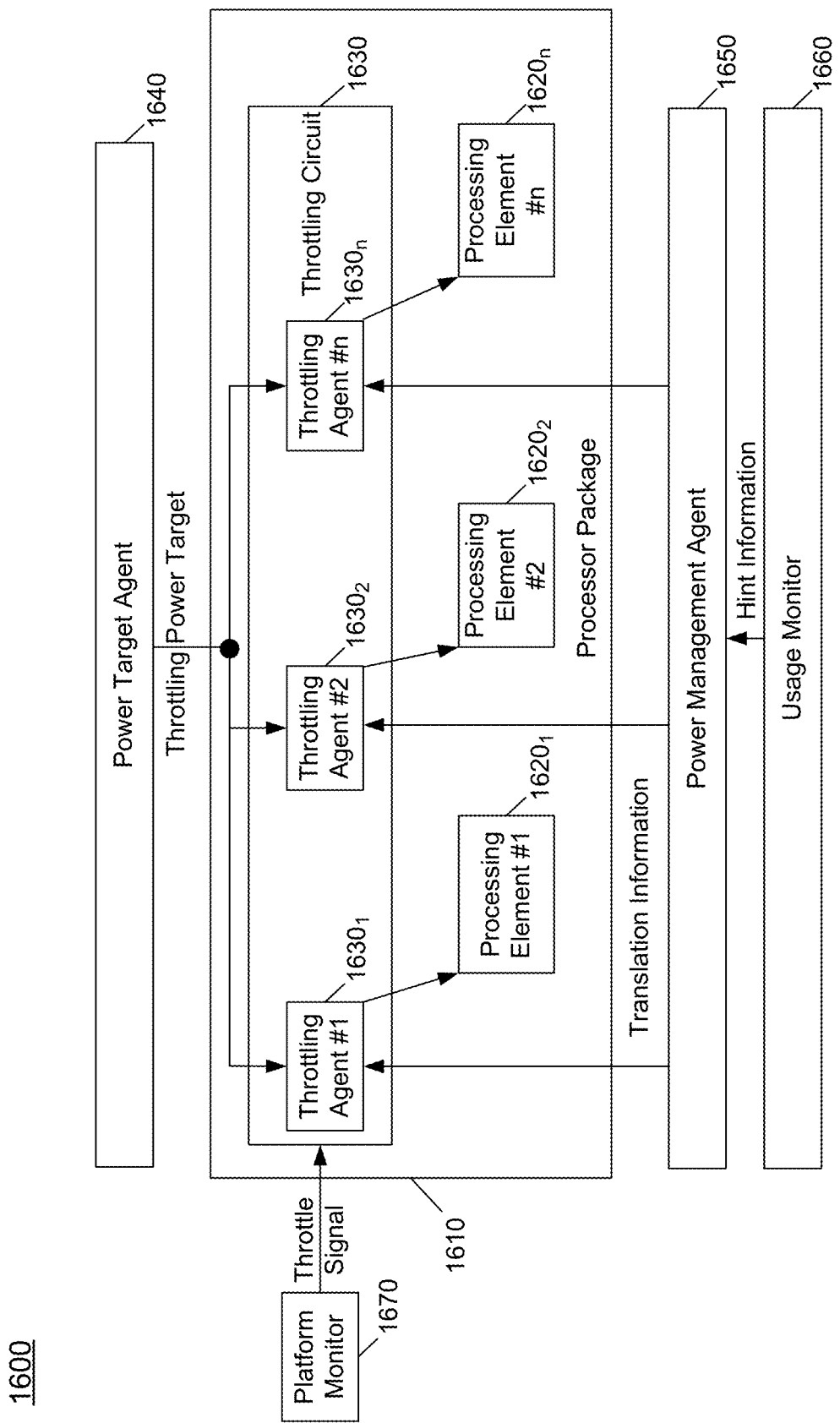
FIG. 16 is a block diagram of a system in accordance with an embodiment.

Referring now to FIG. 16, shown is a block diagram of a system in accordance with an embodiment. More specifically, illustrated in FIG. 16 is a portion of a system 1600 which may be any type of computing system, ranging from small portable device such as mobile phone, tablet computer, laptop computer, or so forth to a larger system such as a desktop system, server computer or so forth. In typical environments of embodiments herein, the computing system may be powered at least sometimes with a battery-based power source, such that a platform electrical failure may be possible. Although the scope of the present invention is not limited in this regard, such electrical failures may include a battery voltage droop below a voltage regulator undervoltage lockout level. Another example may be a battery short circuit protection failure. Platform events also may occur on AC power. For example, an AC adapter also has over-current and short-circuit protection mechanisms. For one, the AC adapter may limit the output current when it reaches a certain threshold and let voltage droop; once the voltage droops below a certain threshold, the AC adapter turns off. To recover, the AC adapter is typically unplugged from the wall. In addition, a programmable power supply typically requires the supply to limit current when the load draws more than a threshold current and turns off when the voltage drops below a threshold voltage. To prevent such electrical failure, a platform agent such as a power management integrated circuit (PMIC) may issue a notification. This notification of a platform event may be effected as a triggering of a platform event signal in response to detection of a possible adverse platform event such as an electrical failure. As described herein, this platform event signal may be used to cause throttling within a processor.

Specifically as illustrated in FIG. 16, system 1600 includes a processor 1610, which may be a multicore processor or other SoC. In embodiments herein, processor 1610 may be implemented as a processor package and may include one or more semiconductor dies. As shown, processor 1610 includes a plurality of processing elements $1620_1$-$1620_n$. In some cases, processing elements 1620 may be homogeneous processing elements such as homogeneous processing cores. However, in many embodiments heterogeneous processing elements 1620, including cores, graphics processors, controllers, specialized function units and so forth, may be present. In some instances, collections of processing elements 1620 may be grouped into so-called domains, which may operate at common or independent performance states.

As further illustrated in FIG. 16, processor 1610 also includes a throttling circuit 1630. In the embodiment shown, throttling circuit 1630 may include a plurality of individual throttling agents $1630_1$-$1630_n$. As illustrated, throttling circuit 1630 may be a distributed hardware circuit with each throttling agent 1630 associated with a corresponding processing element 1620. However, understand the scope of the present invention is not limited in this regard and in other embodiments a correspondence other than 1:1 is possible. In embodiments, throttling circuit 1630 and its constituent throttling agents $1630_1$-$1630_n$ may be implemented as hardware circuits. Furthermore while in the implementation shown in FIG. 16 each throttling agent 1630 is associated with but separate from a corresponding processing element 1620, in some cases a given throttling agent may be included within a corresponding processing element 1620.

Still with reference to FIG. 16, further illustrated is a power target agent (PTA) 1640, a power management agent (PMA) 1650 and a usage monitor 1660. Although shown as external components with respect to processor 1610, in some embodiments PTA 1640, PMA 1650 and usage monitor 1660 may be implemented at least in part in firmware and/or software that executes on one or more processing engines 1620 of processor 1610. For example, PTA 1640 may be implemented within an operating system or other system scheduler. As such, PTA 1640 receives information regarding a status of power source capability (e.g., charge capability). In turn, PMA 1650, which may be firmware or power management microcode in some embodiments, may execute on one or more of processing elements 1620. As an example, a dedicated core or microcontroller may be used to execute PMA 1650 to manage power consumption of processor 1610. And, usage monitor 1660 may also be implemented within an operating system or other system scheduler to monitor user behavior and provide hint information to PMA 1650. Usage monitor 1660 may optimize processor utilization for power (battery runtime) and performance. Note that in an embodiment, usage monitor 1660 may be bundled with power target agent 1640, although these two agents perform different functions.

As further illustrated in FIG. 16, system 1600 further includes a platform monitor 1670. Platform monitor 1670 may be configured to monitor platform events and assert a throttle signal in response to detection of a platform event that is to trigger a throttling. As one example, platform monitor 1670 may include a hardware circuit to compare a critical voltage rail to a threshold. When such rail voltage falls below the threshold, platform monitor 1670 may be configured to output the throttle signal. Although different implementations are certainly possible, in an embodiment platform monitor 1670 may be implemented as a power management integrated circuit (PMIC), charge controller or other platform hardware component.

During normal operation, PTA 1640 may receive input power capability information and based at least in part thereon determine a package throttling power threshold or target, which is a maximum allowed power consumption level for processor 1610 during a platform event. Note that this package throttling power target may be less than a given power target or budget for the processor. In some cases, a processor may be configured with multiple power levels. Such power levels may include one or more lower, long term power budgets or limits (which on average, the processor may not exceed). The processor may further be configured with a higher, instantaneous power budget that may exceed the long term power budget. Understand each configured power budget may have also have an associated throttling power target, in some embodiments.

From a notification of input power capability information, or other platform information such as another notification of high loading on a platform device, PTA 1640 may determine a package throttling power threshold based at least in part on the available charge of a battery source for system 1600. As one example of another notification, when a modem is to operate with a high power spike to transmit to a far base station, the modem may assert the signal to momentarily throttle the processor. Note that in embodiments, power target agent 1640 may monitor input power condition for updates even while a platform is powered by an AC source. Still further, based at least in part on the monitored input power condition, PTA 1640 may proactively set the package throttling power target. PTA 1640 also may send the package throttling power target to throttling agents of throttling circuit 1630.

In turn, power management agent 1650 may, based at least in part on hint information provided by usage monitor 1660, generate translation information to enable throttling agents to transform the package throttling power threshold to processing element throttling power thresholds or targets. As an example, the hint information may correspond to priority hints as to workloads being performed on different types of processing elements 1620. In an embodiment, the hint information is a numerical value for power management agent 1650 to select parameters that are suitable for processor 1610. Such hint information may be an abstraction so that the OS or usage monitor 1660 is not tied to a specific processor (that role is done by power management agent 1650). In one embodiment, usage monitor 1660 may be configured to monitor user behavior and provide hint information as a numerator. For example, assume two different types of user activity, namely file copy activity and gaming activity. With this arrangement, user monitor 1660 may output the hint information with a first hint value (Hint-1) for the file copy activity and a second hint value (Hint-2) and gaming activity. Based at least in part on this hint information, PMA 1650 may provide translation information, e.g., in the form of control signals, to corresponding throttling agents 1630. Power management agent 1650, in response to this particular hint information may: if "Hint-1" is received, set a 10% translation ratio for throttling agent 1630 and set a 90% translation ratio for throttling agent $1630_2$; and if "Hint-2" is received, set a 50% translation ratio for throttling agent $1630_1$, and set a 50% translation ratio for throttling agent $1630_2$. In turn each throttling agent 1630 uses this translation information and the package throttling power threshold to determine appropriate throttling operating points for one or more associated processing elements 1620.

Note that the above discussion of operations to set a package throttling power target and individual processing element throttling power targets may occur proactively during normal operation, e.g., according to given time durations or loops of execution. Then during operation when a given platform event is detected that is to trigger processor throttling, a fast low latency hardware-based operation to throttle individual processing elements 1620 occurs. That is, when platform monitor 1670 identifies a change in the platform such as a switch of operating power from an AC source to the battery source, it sends a throttle signal to throttling circuit 1630 to indicate a platform event has been incurred. And in response to this throttle signal, individual throttling agents 1630 immediately force corresponding processing elements 1620 to operate at no greater than the corresponding throttle operating point, enabling low latency throttling. Understand while shown at this high level in the embodiment of FIG. 16, many variations and alternatives are possible.

Figure 17:
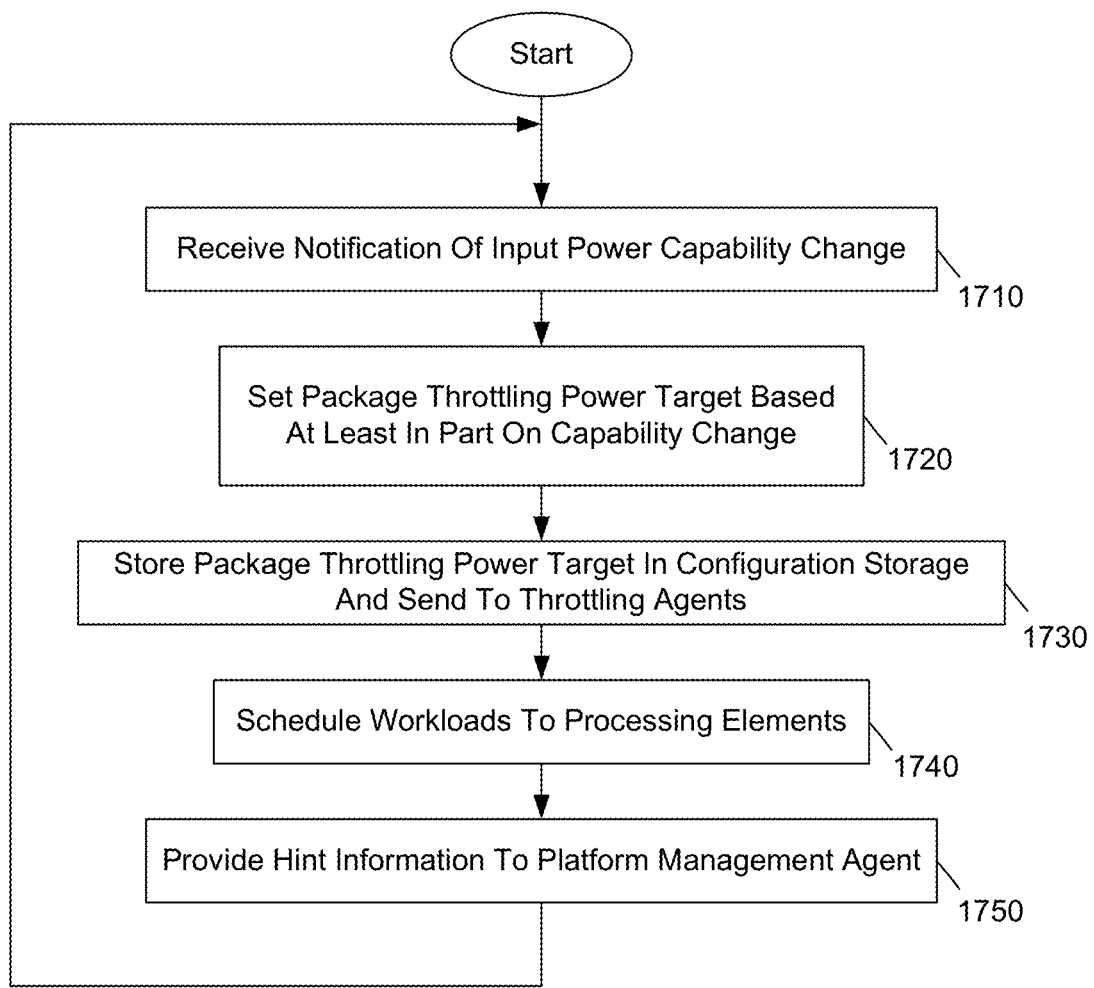
FIG. 17 is a flow diagram of a method in accordance with an embodiment of the present invention.

Referring now to FIG. 17, shown is a flow diagram of a method in accordance with an embodiment of the present invention. More specifically, method 1700 is a method for controlling platform power consumption by a power target agent in accordance with an embodiment, as well as monitoring user activity by a user monitor. As such, method 1700 may be performed by hardware circuitry, software, firmware and/or combinations thereof. In a particular embodiment, a power target agent and a usage monitor may be implemented at least in part as software, and in one particular embodiment, the agents may be included within an operating system or other supervisor software.

As illustrated, method 1700 begins by receiving a notification of a input power source capability change (block 1710). The input power source capability change can be the battery capability or the AC power source state. The battery capability may change due to the battery state of charge, temperature, or aging effect. The AC power source may be a USB power delivery hub, which changes the advertised power depending on the number of ports plugged in. Such indication of input power capability change may be a routine notification provided to the platform target agent from one or more platform entities such as a PMIC, battery fuel gauge, USB power delivery controller, battery charging circuit, voltage regulator or so forth. For example, a periodic notification of the battery capability (e.g., charge percentage) may be provided. Or in other cases, the power target agent may routinely poll for this information.

In any event, control passes from block 1710 to block 1720 where a package throttling power target may be set based at least in part on this capability change. More specifically as described herein, a peak power threshold can be set that is based at least in part on the charge capability of the battery. As one representative example, when a platform is powered by a battery, the power target agent may set a package throttling power target to a level of 50 Watts (W) when the battery has 80% charge, and at 30 W when the battery has 20% charge. Note that even while the platform is provided with an AC power source, the power target agent may be configured to set or program the package throttling power target to 50 W when the battery has 80% charge and program 30 W when battery has 20% charge (per the above representative example). At block 1730 this package throttling power target may be stored in a configuration storage. For example, this information may be stored in a throttling power threshold field of a configuration register of the processor. In addition, the power target agent may send this package throttling power target to the throttling agents.

The power target agent (or another portion of an operating system or other system software) may perform scheduling activities as well. Thus as further illustrated in FIG. 17, at block 1740 the power target agent may schedule workloads to the processing elements. For example, compute-intensive workloads may be scheduled to core processing elements, graphics-intensive workloads may be scheduled to graphics processing elements, network workloads may be scheduled to interface controllers and so forth. At block 1750 the usage monitor may provide hint information to a power management agent. More specifically, this hint information may relate to priority information regarding the workloads being scheduled on the different types of processing elements. For example, for compute-centric workloads, the core processing elements may have higher priority and thus this hint information may indicate the same. In turn, for a graphics-intensive workload, the graphics processing element(s) may have a higher priority and thus corresponding higher priority hint information for these processing element(s) may be provided in this instance. Although the scope of the present invention is not limited in this regard, in one embodiment this hint information may take the form of translation ratios or so forth. Understand while shown at this high level in the embodiment of FIG. 17, many variations and alternatives are possible.

Figure 18:
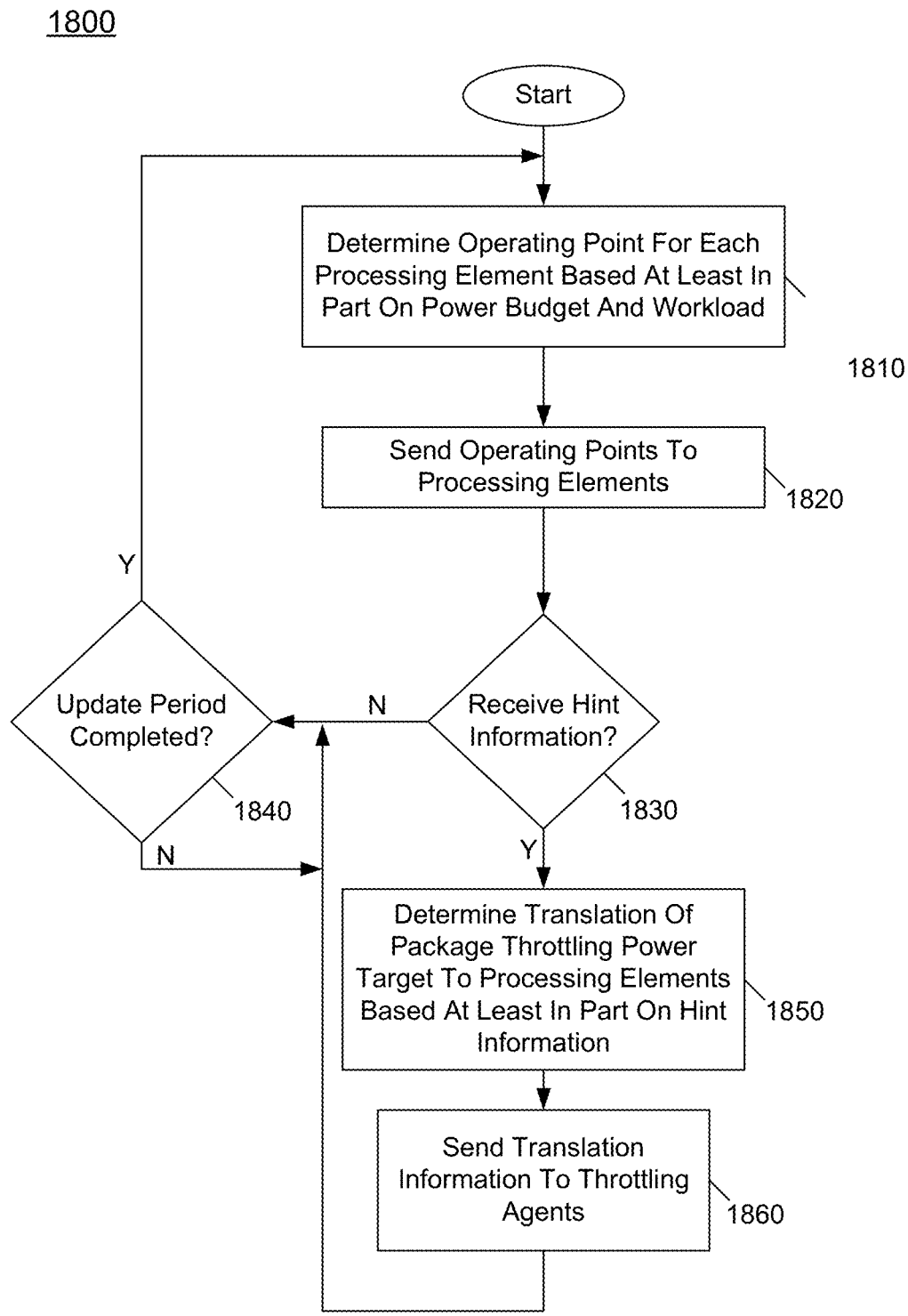
FIG. 18 is a flow diagram of a method in accordance with another embodiment of the present invention.

Referring now to FIG. 18, shown is a flow diagram of a method in accordance with another embodiment of the present invention. More specifically as shown in FIG. 18, method 1800 is a method for controlling power consumption within a processor via a power management agent as described herein. As such, method 1800 may be performed by hardware circuitry, software, firmware and/or combinations thereof. In a particular embodiment, a power management agent may be implemented at least in part as hardware circuitry and firmware, and in one particular embodiment, the power management agent may be a dedicated processing element such as a dedicated core or microcontroller to execute power management code.

As illustrated, method 1800 begins by determining an operating point for each processing element based at least in part on a power budget and a workload (block 1810). For example, assume that a processor is configured with a given power budget such as a TDP level or other long term power level at which the processor may operate (and which may be stored in a configuration storage of the processor). Also the power management agent may have information as to workloads to be executed on the different processing elements. Thus in an embodiment, the power management agent may be configured to determine the operating point of each processing element, based at least in part on requests from host software to deliver a desired combination of power and performance. As such, the power management agent may perform an allocation or budgeting of this total power budget to each of the processing elements. For example, when all processing elements perform equal workloads, a common operating point may be determined for each of the processing elements. Instead in more typical scenarios, some processing elements may have higher workloads and/or may consume higher power than other processing elements. As such, asymmetric operating points (e.g., each formed of an operating voltage and an operating frequency, among other potential parameters) may be determined for each processing element. Thereafter at block 1820 these operating points may be sent to the individual processing elements. In response to this operating point information, the processing elements are caused to operate at such operating points. Understand that these operations at blocks 1810 and 1820 may proceed iteratively during normal operation of a platform.

Still with reference to FIG. 18 at diamond 1830 it is determined whether hint information is received (e.g., from a usage monitor). If it is determined that no such hint information is received, control next passes to diamond 1840 to determine whether an update period has completed. This update period is a duration at which the power management agent may analyze power budget and current workload to determine whether to update operating points. If this update period has completed, control passes back to block 1810 discussed above.

Still with reference to FIG. 18, instead if it determined that updated hint information has been received, control passes to block 1850. At block 1850, a translation may be determined. More specifically, this translation is some form of operation to take the package throttling power target and appropriately allocate it between the different processing elements. In embodiments, the power management agent may perform this translation based at least in part on the hint information received from the usage monitor. In this way, a fairer allocation of available power budget to the different processing elements based on their priority, criticality, user usefulness or so forth may occur.

In one embodiment, the translation of package-to-element throttling power may be by way of a scaling factor. In one such example, assume a processor includes two processing elements (core and graphics processor), and also assume the package throttling power threshold is 50 W. Further assume for example purposes that when a workload is core-intensive (e.g., host software copying of files), the power management agent generates translation information to set a 90% ratio to the core and 10% to the graphics processor. With this ratio or scaling factor arrangement, the resulting power budget for the processing elements corresponds to a level of 45 W for the core and 5 W for the graphics processor. Assume instead a workload (e.g., for host software rendering of images) is such that the power management agent sets a 20% ratio to the core and an 80% ratio to the graphics processor. With this ratio or scaling factor arrangement, the resulting power budget for the processing elements corresponds to a level of 10 W for the core and 40 W for the graphics.

Note that embodiments may use different techniques to enable the power management agent to provide translation information to define the budgeting to be dynamically calculated by each throttling agent. Thus although different manners of performing this translation are possible, in some examples the allocation may occur according to ratio information associated with each of the processing elements. Or based upon the translation operation performed by the power management agent, pointer information may be provided. In turn the pointer information is used to enable access to a table that includes operating point information. In an example in which the translation information includes ratio information, a setting of a ratio value (e.g., coefficient) for each processing element may be based at least in part on the hint information received from the usage monitor. Finally with further reference to FIG. 18, control passes to block 1860 where the translation information may be sent to the throttling agents. Although shown at this high level in the embodiment of FIG. 18, many variations and alternatives are possible.

Figure 19:
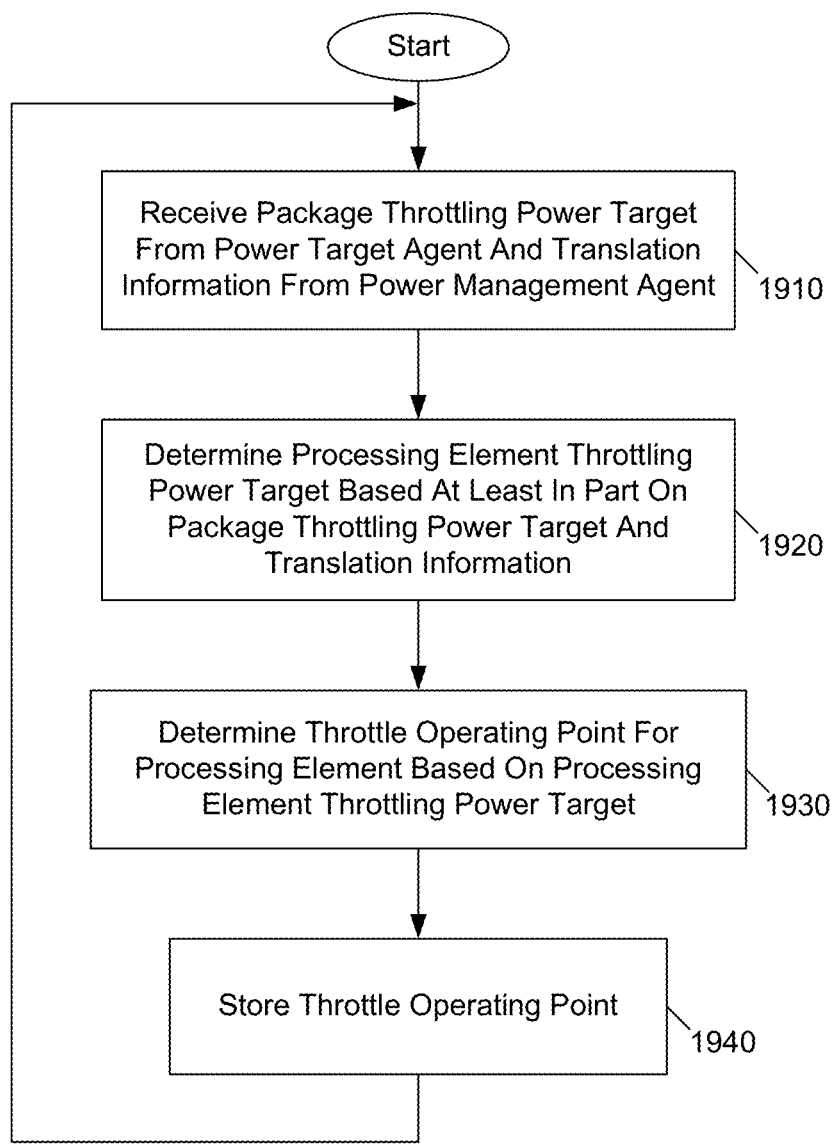
FIG. 19 is a flow diagram of a method in accordance with yet another embodiment of the present invention.

Referring now to FIG. 19, shown is a flow diagram of a method in accordance with yet another embodiment of the present invention. More specifically, method 1900 is a method for setting processing element power throttling limits using a throttling agent in accordance with an embodiment. As such, method 1900 may be performed by hardware circuitry, software, firmware and/or combinations thereof. In a particular embodiment, one or more hardware circuits may be provided (such as a distributed throttling circuit having a plurality of individual hardware circuits each associated with at least one processing element) to perform method 1900. Note that method 1900, used to set individual platform element throttling power targets, may be executed according to a so-called slow loop, as this target setting may be performed in a non-critical manner since such operations do not impact the low latency initiation of an actual throttling operation.

As shown in FIG. 19, method 1900 begins by receiving a package throttling power target from a power target agent and translation information from a power management agent (block 1910). Although shown as a single operation in FIG. 19, understand that these two different values may be received asynchronously (and from the two different entities) and according to a given time duration. In any event, control next passes to block 1920 where a processing element throttling power target may be determined based as least in part on these two values. As one example, a throttling agent calculates a processing element throttling power target ($P_{element\_throttle}$) as a function of the package throttling power target ($P_{package\_throttle}$) (as set by the power target agent) and a coefficient ($c_{power\_management}$) (as given by the power management agent), e.g., according to the following equation: $P_{element\_throttle}=f$ ($P_{package\_throttle}$, $c_{power\_management}$). In some embodiments, there may not be a particular timing requirement for the throttling agent to translate from package-to-element throttling power thresholds. This is because the power target agent may set the throttle power only in response to specific platform events (e.g., change in battery condition), which may typically have a latency on the order of few seconds. In addition, understand that the power management agent may optimize to host software activity types, which typically do not have hard timing requirements.

In another embodiment, a throttling agent may be configured to maintain a lookup table (which may be provided by platform firmware, e.g., basic input/output system (BIOS)). With this embodiment, the power management agent provides a pointer to the lookup table for a given set of package throttling power thresholds.

Still with reference to FIG. 19, control next passes to block 1930, where a throttle operating point for the processing element may be determined based on this processing element throttling power target. As an example, the throttling agent may access a local lookup table based on this processing element throttling power target to identify a corresponding operating point (e.g., voltage/frequency pair). Next at block 1940, the throttle operating point may be stored in a given storage location, e.g., internally to the throttling agent. As one example, the throttling agent may include a configuration storage to store a determined throttle operating point which, as described further below, may be read and used to control throttle activities when a throttle indication is received.

Note that with embodiments herein, the resulting operating points for different processing elements may be at asymmetric levels, based at least in part or priority of the processing elements for a given workload. Still further, understand that at least one processing element (and possibly multiple ones) may be caused to operate at a throttle operating point greater than a minimal operating point. That is, based on battery capability (e.g., charge level), a throttle operating point may be higher than a typical throttle point (namely at a lowest operating point, which may be stored in a configuration storage of the processor). As an example, this lowest operating point may correspond to a low frequency mode, which is a lowest frequency and voltage at which a processor may operate. Understand while shown at this high level in the embodiment of FIG. 19, many variations and alternatives are possible.

In embodiments, the throttling agents may use the calculated processing element throttling power targets to cause one or more associated processing elements to operate at a given operating point. For a core or graphics processor, the operating point may be translated to an operating voltage/frequency pair. For other processing elements such as an input/output (IO) port, the operating point may be translated to other operating parameters, such as dynamic link width, bandwidth or so forth. Note that the throttling agents may be configured to execute the throttling immediately to avoid platform electrical failure. In some cases, if a processing element cannot immediately transition to the indicated throttling operating point (e.g., due to hardware limitation), it may first transition to a safe state (e.g., an intermediate operating point lower than a current operating point but higher than the throttle operating point) before locking to the optimal throttling state.

Figure 20:
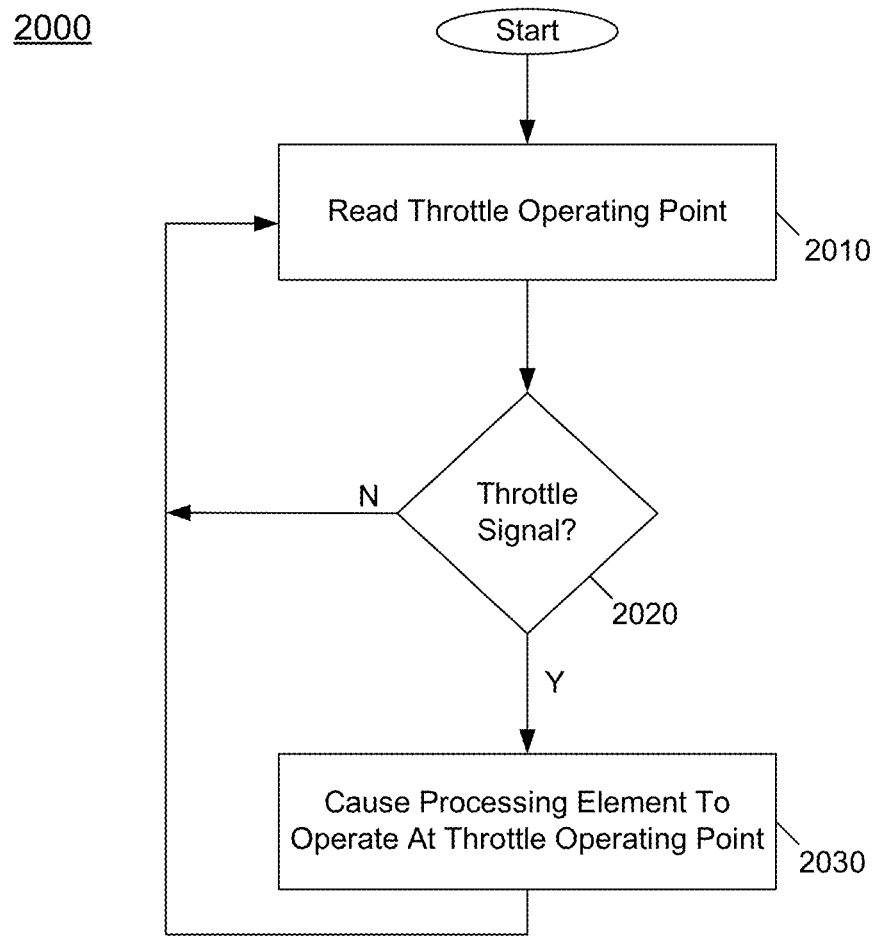
FIG. 20 is a flow diagram of a method in accordance with yet another embodiment of the present invention.

Referring now to FIG. 20, shown is a flow diagram of a method in accordance with yet another embodiment of the present invention. More specifically, method 2000 of FIG. 20 is a method for throttling a processing element using a throttling agent in accordance with an embodiment. As such, method 2000 may be performed by hardware circuitry, software, firmware and/or combinations thereof. With embodiments herein, method 2000 may be performed by a given hardware circuit, namely a given throttling agent. By use of hardware circuits (and potentially dedicated hardware circuits associated with one or more processing elements), throttle operations may occur with very low latency. As such, method 2000 may be executed according to a fast loop to enable low latency throttling to occur. For example, in one embodiment throttling agents may be configured to cause throttling to occur within a latency window of sub-microsecond from an indication of a platform event. Note that by use of distributed hardware circuits in embodiments, the overhead of an OS or other system software (and/or power control circuitry/firmware, such as a power management agent) determining appropriate throttling points and controlling processing elements can be avoided.

As illustrated in FIG. 20, method 2000 begins by reading the throttle operating point (block 2010). As discussed above, this throttle operating point may be stored in a configuration storage of the throttling agent. Next, it is determined at diamond 2020 whether a throttle signal is received, e.g., from a platform monitor. As described herein, this throttle signal is thus an indication to the throttling agent that the processor now is to be controlled to operate at a power level no greater than the package throttling power threshold. As such, when (e.g.) the AC source is removed an indication of a platform event occurs (e.g., a throttle signal). In response to this indication, the processor may be configured to throttle overall power consumption to the previously programmed power target (e.g., 50 W at 80% charge and 30 W at 20% as set by the power target agent).

If it is determined that a throttle signal has been received, control passes to block 2030 where the processing element is caused to operate at the throttle operating point. For example, in cases where a processing element includes an internal clock generator and associated voltage regulator, the throttling agent may send an operating point command to cause one or more of operating frequency and operating voltage to be updated internally to the processing element. In other cases, the throttling agent may communicate with other control components, such as associated clock generators, voltage regulators, link state machines or so forth, to control appropriate operating parameters so that the processing element operates at a power level no greater than the processing element throttling power threshold. Understand while shown at this high level in the embodiment of FIG. 20, many variations and alternatives are possible.

The following examples pertain to further embodiments.

In one example, a processor includes: a plurality of processing elements to perform operations; a PMA coupled to the plurality of processing elements to control power consumption of the plurality of processing elements; and a throttling circuit coupled to the PMA. The throttling circuit may include a plurality of throttling agents each associated with one of the plurality of processing elements, where the PMA is to communicate translation information to the throttling circuit and each of the plurality of throttling agents is to determine a throttling power level for an associated one of the plurality of processing elements based at least in part on the translation information.

In an example, the translation information comprises ratio information, and the PMA is to determine the translation information based at least in part on hint information received from a usage monitor, the hint information to indicate relative priority of the plurality of processing elements.

In an example, the translation information comprises pointer information, and a first throttling agent of the plurality of throttling agents is to access a lookup table with a first pointer of the pointer information to determine a first throttling power level for a first processing element.

In an example, the first throttling agent is to determine a first operating point for the first processing element based on the first throttling power level and send an operating point update to the first processing element to cause the first processing element to operate at the first operating point.

In an example, the first operating point is greater than a minimum operating point.

In an example, the power target agent is to set a package throttling power level for the processor based at least in part on a change to a charge capability of a battery.

In an example, a platform monitor is to communicate a throttling signal to the throttling circuit in response to a platform event, where the platform event comprises a switch of the platform to battery operation, the power target agent to further communicate the package throttling power level to the throttling circuit.

In an example, the package throttling power level is less than a thermal design power of the processor, and the throttling circuit is to cause at least some of the plurality of processing elements to operate at an operating point greater than a minimum operating point.

In another example, a method comprises: determining, in a power controller of a SoC including a plurality of processing circuits, in response to a platform event, translation information for a throttling power threshold for the SoC, based at least in part on hint information; and sending the translation information to a plurality of throttling agents of the SoC, each of the plurality of throttling agents associated with at least one of the plurality of processing circuits, to cause the plurality of throttling agents to update an operating point of at least one of the plurality of processing circuits to a throttle level greater than a minimum operating point, based at least in part on the translation information.

In an example, the method further comprises receiving the hint information from a usage monitor, the hint information comprising priority information regarding the plurality of processing circuits.

In an example, the method further comprises: receiving the translation information in the plurality of throttling agents; causing, by a first throttling agent of the plurality of throttling agents, a first processing circuit of the plurality of processing circuits to operate at a first operating point based on a first translation element of the translation information; and causing, by a second throttling agent of the plurality of throttling agents, a second processing circuit of the plurality of processing circuits to operate at a second operating point based on a second translation element of the translation information, the second operating point greater than the first operating point, and where the second processing circuit has a higher priority than the first processing circuit according to the hint information.

In an example, determining the translation information comprises generating a plurality of coefficients each associated with one of the plurality of processing circuits, based at least in part on the hint information.

In an example, the method further comprises: calculating, in a first throttling agent of the plurality of throttling agents, a first throttling power level for a first processing circuit of the plurality of processing circuits based on a first coefficient of the plurality of coefficients and a throttling power limit for the SoC; and causing the first processing circuit to operate at a first operating point based on the first throttling power level, the first operating point greater than the minimum operating point.

In an example, the method further comprises: causing the first processing circuit to operate at an intermediate operating point, the intermediate operating point lower than a prior operating point at which the first processing circuit was operating and higher than the first operating point; and causing the first processing circuit to operate at the first operating point after a hardware limitation on the first processing circuit has completed.

In an example, determining the translation information comprises generating a plurality of pointers each associated with one of the plurality of processing circuits, based at least in part on the hint information.

In an example, the method further comprises: accessing, by a first throttling agent of the plurality of throttling agents, a table using a first pointer of the plurality of pointers, to obtain a first throttling power level for a first processing circuit of the plurality of processing circuits; and causing the first processing circuit to operate at a first operating point based on the first throttling power level, the first operating point greater than the minimum operating point.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: a first power source to provide power to the system; a second power source to provide power to the system, the second power source comprising a battery; a charging circuit to charge the second power source; a power management integrated circuit coupled to a processor, where the power management integrated circuit is to send a throttling signal to the processor in response to a switch of power from the first power source to the second power source, where at least one of the second power source and the charging circuit is to communicate a charge capability of the battery to the processor; and the processor.

In an example, the processor may include: at least one core to execute first instructions; at least one graphics processor to execute second instructions; a power controller coupled to the at least one core and the at least one graphics processor to control power consumption of the at least one core and the at least one graphics processor according to a power budget for the processor, where a power target agent is to proactively determine a throttling power budget for the processor based at least in part on the charge capability. In turn, the power controller is to proactively determine translation information based on a priority of the at least one core and the at least one graphics processor. The processor may further include a throttling circuit coupled to the power controller, where the throttling circuit is to proactively determine a first throttling power budget for the at least one core and a second throttling power budget for the at least one graphics processor based at least in part on the translation information and the throttling power budget, and in response to the throttling signal, cause the at least one core to operate at a first operating point based on the first throttling power budget and cause the at least one graphics processor to operate at a second operating point based on the second throttling power budget.

In an example, the translation information comprises ratio information, and the power controller is to determine the translation information based at least in part on hint information received from a usage monitor, the hint information to indicate relative priority of the at least one core and the at least one graphics processor.

In an example, the translation information comprises pointer information, and the throttling circuit is to access a lookup table with a first pointer of the pointer information to determine the first throttling power budget for the at least one core and access the lookup table with a second pointer of the pointer information to determine the second throttling power budget for the at least one graphics processor.

In an example, the power controller is to: cause the at least one core to operate at an intermediate operating point, the intermediate operating point lower than a prior operating point at which the at least one core was operating and higher than the first operating point, the first operating point greater than a minimum operating point; and cause the at least one core to operate at the first operating point after a hardware limitation on the at least one core has completed.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of processing elements to perform operations;
a power management agent (PMA) coupled to the plurality of processing elements to control power consumption of the plurality of processing elements; and
a throttling circuit coupled to the PMA, the throttling circuit including a plurality of throttling agents each associated with one of the plurality of processing elements, wherein the PMA is to communicate translation information to the throttling circuit and each of the plurality of throttling agents is to determine a throttling power level for an associated one of the plurality of processing elements based at least in part on the translation information.

2. The processor of claim 1, wherein the translation information comprises ratio information, and wherein the PMA is to determine the translation information based at least in part on hint information received from a usage monitor, the hint information to indicate relative priority of the plurality of processing elements.

3. The processor of claim 1, wherein the translation information comprises pointer information, and wherein a first throttling agent of the plurality of throttling agents is to access a lookup table with a first pointer of the pointer information to determine a first throttling power level for a first processing element.

4. The processor of claim 3, wherein the first throttling agent is to determine a first operating point for the first processing element based on the first throttling power level and send an operating point update to the first processing element to cause the first processing element to operate at the first operating point.

5. The processor of claim 4, wherein the first operating point is greater than a minimum operating point.

6. The processor of claim 1, wherein a power target agent is to set a package throttling power level for the processor based at least in part on a change to a charge capability of a battery.

7. The processor of claim 6, wherein a platform monitor is to communicate a throttling signal to the throttling circuit in response to a platform event, wherein the platform event comprises a switch of the platform to battery operation, the power target agent to further communicate the package throttling power level to the throttling circuit.

8. The processor of claim 6, wherein the package throttling power level is less than a thermal design power of the processor, and wherein the throttling circuit is to cause at least some of the plurality of processing elements to operate at an operating point greater than a minimum operating point.

9. At least one non-transitory computer readable storage medium having stored thereon instructions, which if performed by a machine cause the machine to perform a method comprising:
determining, in a power controller of a system on chip (SoC) including a plurality of processing circuits, in response to a platform event, translation information for a throttling power threshold for the SoC, based at least in part on hint information received from a usage monitor, the hint information comprising priority information regarding the plurality of processing circuits; and
sending the translation information to a plurality of throttling agents of the SoC, each of the plurality of throttling agents associated with at least one of the plurality of processing circuits, to cause the plurality of throttling agents to update an operating point of at least one of the plurality of processing circuits to a throttle level greater than a minimum operating point, based at least in part on the translation information.

10. The at least one non-transitory computer readable storage medium of claim 9, wherein the method further comprises:
receiving the translation information in the plurality of throttling agents;
causing, by a first throttling agent of the plurality of throttling agents, a first processing circuit of the plurality of processing circuits to operate at a first operating point based on a first translation element of the translation information; and
causing, by a second throttling agent of the plurality of throttling agents, a second processing circuit of the plurality of processing circuits to operate at a second operating point based on a second translation element of the translation information, the second operating point greater than the first operating point, and wherein the second processing circuit has a higher priority than the first processing circuit according to the hint information.

11. The at least one non-transitory computer readable storage medium of claim 9, wherein determining the translation information comprises generating a plurality of coefficients each associated with one of the plurality of processing circuits, based at least in part on the hint information.

12. The at least one non-transitory computer readable storage medium of claim 11, wherein the method further comprises:
calculating, in a first throttling agent of the plurality of throttling agents, a first throttling power level for a first processing circuit of the plurality of processing circuits based on a first coefficient of the plurality of coefficients and a throttling power limit for the SoC; and
causing the first processing circuit to operate at a first operating point based on the first throttling power level, the first operating point greater than the minimum operating point.

13. The at least one non-transitory computer readable storage medium of claim 12, wherein the method further comprises:
causing the first processing circuit to operate at an intermediate operating point, the intermediate operating point lower than a prior operating point at which the first processing circuit was operating and higher than the first operating point; and
causing the first processing circuit to operate at the first operating point after a hardware limitation on the first processing circuit has completed.

14. The at least one non-transitory computer readable storage medium of claim 9, wherein determining the translation information comprises generating a plurality of pointers each associated with one of the plurality of processing circuits, based at least in part on the hint information.

15. The at least one non-transitory computer readable storage medium of claim 14, wherein the method further comprises:
accessing, by a first throttling agent of the plurality of throttling agents, a table using a first pointer of the plurality of pointers, to obtain a first throttling power level for a first processing circuit of the plurality of processing circuits; and
causing the first processing circuit to operate at a first operating point based on the first throttling power level, the first operating point greater than the minimum operating point.

16. A system comprising:
a first power source to provide power to the system;
a second power source to provide power to the system, the second power source comprising a battery;
a charging circuit to charge the second power source;
a power management integrated circuit coupled to a processor, wherein the power management integrated circuit is to send a throttling signal to the processor in response to a switch of power from the first power source to the second power source, wherein at least one of the second power source and the charging circuit is to communicate a charge capability of the battery to the processor; and
the processor comprising:
at least one core to execute first instructions;
at least one graphics processor to execute second instructions;
a power controller coupled to the at least one core and the at least one graphics processor to control power consumption of the at least one core and the at least one graphics processor according to a power budget for the processor, wherein a power target agent is to proactively determine a throttling power budget for the processor based at least in part on the charge capability, the power controller to proactively determine translation information based on a priority of the at least one core and the at least one graphics processor; and
a throttling circuit coupled to the power controller, wherein the throttling circuit is to proactively determine a first throttling power budget for the at least one core and a second throttling power budget for the at least one graphics processor based at least in part on the translation information and the throttling power budget, and in response to the throttling signal, cause the at least one core to operate at a first operating point based on the first throttling power budget and cause the at least one graphics processor to operate at a second operating point based on the second throttling power budget.

17. The system of claim 16, wherein the translation information comprises ratio information, and wherein the power controller is to determine the translation information based at least in part on hint information received from a usage monitor, the hint information to indicate relative priority of the at least one core and the at least one graphics processor.

18. The system of claim 16, wherein the translation information comprises pointer information, and wherein the throttling circuit is to access a lookup table with a first pointer of the pointer information to determine the first throttling power budget for the at least one core and access the lookup table with a second pointer of the pointer information to determine the second throttling power budget for the at least one graphics processor.

19. The system of claim 16, wherein the power controller is to:
cause the at least one core to operate at an intermediate operating point, the intermediate operating point lower than a prior operating point at which the at least one core was operating and higher than the first operating point, the first operating point greater than a minimum operating point; and
cause the at least one core to operate at the first operating point after a hardware limitation on the at least one core has completed.

* * * * *